US012014420B1

(12) United States Patent
Bond et al.

(10) Patent No.: US 12,014,420 B1
(45) Date of Patent: *Jun. 18, 2024

(54) SYSTEM AND METHOD FOR MANAGING DATA FOR DELIVERING A PRE-CALCULATED DEFINED INVESTMENT OUTCOME IN AN EXCHANGE-TRADED FUND

(71) Applicant: Innovator Capital Management, LLC, Wheaton, IL (US)

(72) Inventors: H. Bruce Bond, Wheaton, IL (US); John Wilder Southard, Jr., Wheaton, IL (US); Graham Alexander Day, Wheaton, IL (US)

(73) Assignee: Innovator Capital Management, LLC, Wheaton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,228

(22) Filed: Jun. 26, 2023

Related U.S. Application Data

(63) Continuation of application No. 17/721,260, filed on Apr. 14, 2022, now Pat. No. 11,734,765, which is a continuation of application No. 16/930,150, filed on Jul. 15, 2020, now Pat. No. 11,334,950.

(60) Provisional application No. 62/874,495, filed on Jul. 15, 2019.

(51) Int. Cl.
*G06Q 40/06* (2012.01)
*G06F 3/0482* (2013.01)

(52) U.S. Cl.
CPC ........... *G06Q 40/06* (2013.01); *G06F 3/0482* (2013.01)

(58) Field of Classification Search
CPC .............................. G06Q 40/06; G06F 3/0482
See application file for complete search history.

(56) References Cited

U.S. PATENT DOCUMENTS

| 8,671,049 | B1 | 3/2014 | Wei Koh |
| 2002/0055905 | A1 | 5/2002 | Jannah et al. |
| 2006/0167779 | A1 | 7/2006 | Turner |
| 2006/0200400 | A1 | 9/2006 | Hunter et al. |

(Continued)

FOREIGN PATENT DOCUMENTS

| CA | 2481103 | | 3/2003 | | |
| EP | 1826719 | A1 * | 8/2007 | ............. | G06Q 20/10 |

(Continued)

OTHER PUBLICATIONS

JP Morgan: Buffered Reurn Enhanced Notes and Return Enhanced Notes, 2007, pp. 1-6. (Year: 2007).*

(Continued)

*Primary Examiner* — Bijendra K Shrestha
(74) *Attorney, Agent, or Firm* — Morgan, Lewis & Bockius

(57) ABSTRACT

A computer-based apparatus for managing data based on performance of an underlying securities index including a memory element of a computer configured to store computer executable instructions and a processor for the computer, configured to execute the computer readable instructions to receive information on a lower buffer threshold against losses for an investment, and determine a total return on the investment during an outcome period o, wherein the total return is adjusted to fall above the buffer threshold.

18 Claims, 13 Drawing Sheets

(56) References Cited

U.S. PATENT DOCUMENTS

| | | | | |
|---|---|---|---|---|
| 2014/0122371 | A1* | 5/2014 | Sood | G06Q 40/04 |
| | | | | 705/36 R |
| 2015/0019457 | A1* | 1/2015 | Chuang | G06Q 40/06 |
| | | | | 705/36 R |
| 2016/0063630 | A1* | 3/2016 | Molloy | G06F 3/04847 |
| | | | | 705/36 R |
| 2019/0370894 | A1 | 12/2019 | Meyers | |

FOREIGN PATENT DOCUMENTS

| | | | | |
|---|---|---|---|---|
| WO | WO-2006055622 A2 * | 5/2006 | | G06Q 40/00 |
| WO | 2015149035 A1 | 10/2015 | | |
| WO | WO-2017031553 A1 * | 3/2017 | | G06F 3/0482 |

OTHER PUBLICATIONS

Innovator Capital Management (ICM): Innovator looks to start a new ETF revolution: Set to list first ETFs that protect against losses of 10%, 15%, or 30%, Aug. 3, 2018, pp. 1-8 (Year: 2018).*
Halpen,Joseph: Introducing Protection Into Your Portfolio, Aug. 2014, pp. 1-12( Year:2014) (Year: 2014).*
Chen, Max: ETFs with a Built-In Downside Buffer are Working as Intended, Jul. 22, 2019 Innovative Channel, pp. 1-4 (Year: 2019).*
Andrea Riquier, 'Anything can happen:' Why the hottest investing trend is playing it safe, Market Extra, last updated Oct. 12, 2020, downloaded from https://www.marketwatch.com/story/is-there-a-trust-problem-among-etfs-2019-12-03https://www.marketwatch.com/story/the-decades-hottest-investing-trend-playing-it-safe-11601585149?mod=andrea-riquier, 6 pgs.
Andrea Riquier, Time, money and effort . . . and then your great ETF idea gets ripped off, MarketWatch's New York newsroom, Dec. 6, 2019, downloaded from https://www.marketwatch.com/story/is-there-a-trust-problem-among-etfs-2019-12-03, 7 pgs.
Bruce Bond, Innovator's Bond on Defined Outcome ETFs, May 7, 2019, downloaded from https://www.riachannel.com/innovators-bond-on-defined-outcome-etfs/, 2 pgs.
Innovator, Innovator Nasdaq-100 Power Buffer ETF—July Series, Innovator Defined Outcome ETF's First Outcome Period Recap, Jul. 2021, 4 pgs.
Innovator, Innovator S&P 500 Buffer ETF—August Series, Innovator Defined Outcome ETF's First Outcome Period Recap: Aug. 1, 2020-Jul. 31, 2021, 5 pgs.
Innovator, Innovator U.S. Equity Buffer ETFs—September Series, Outcome Period Recap: Sep. 1, 2020-Aug. 31, 2021, 5 pgs.
Innovator, Using Innovator ETFs to Navigate the Second Half of 2021, Innovator ETFs, 5 pgs.
Innovator, Backward—vs forward-looking investing, Innovator Defined Outcome ETFs, 2 pgs.
Innovator, What risks are lurking in your Target Date Funds?, Implementation Idea for Innovator Defined Outcome ETFs, Innovator Defined Outcome ETFs, 2 pgs.
Innovator, at the Forefront of Innovation, Innovator Defined Outcome ETFs, Jun. 30, 2021, 3 pgs.
Innovator, Defined Outcome ETF Trade Idea: Short-term Bond/Cash Alternative, Innovator Defined Outcome ETFs, 3 pgs.
Innovator, Emerging Markets: From Gray Skies to Green Shoots, Innovator Defined Outcome ETFs, 7 pgs.
Innovator, The Future of a 60/40 Allocation, Innovator Defined Outcome ETFs, Implementation Idea for Innovator Defined Outcome ETFs, 3 pgs.
Innovator, How Innovator Defined Outcome ETFs achieve tax efficiency, Innovator Defined Outcome ETFs, 2 pgs.
Innovator, Understanding Your Experience with Innovator Defined Outcome ETFs, Innovator Defined Outcome ETFs, 6 pgs.
Innovator, Weekly Rate Sheet, Innovator Defined Outcome ETFs, as of Market close on Sep. 24, 2021, 4 pgs.
Innovator, Innovator ETFs Product List, 3 pgs.
Innovator, FAQ, Innovator Defined Outcome ETFs, 3 pgs.
Innovator, Stacker ETFS, Innovator Defined Outcome ETFs Series, Leading the Defined Outcome ETF Revolution, 4 pgs.
Innovator, Intraperiod Expectations of Stacker ETFs, Innovator Defined Outcome ETFs, 3 pgs.
Innovator, How Stacker ETFs Work, Innovator Defined Outcome ETFs, 4 pgs.
Innovator, Create a "Step-up" Strategy for Clients, Advisor Implementation Idea, Innovator Defined Outcome ETFs, 2 pgs.
Innovator, 3 Reasons for the S&P 500 Buffer ETFs—April Series, Innovator Defined Outcome ETFs, 3 pgs.
Innovator, The Case for Global Equity Buffer ETFs—April Series Today, Innovator Defined Outcome ETFs, 3 pgs.
Innovator, Trading the Innovator Defined Outcome ETFs, Innovator Defined Outcome ETFs, 4 pgs.
Innovator, The case for using Defined Outcome ETFs as a core bond fund alternative, Innovator Defined Outcome ETFs, 4 pgs.
Innovator, Use Cases for Defined Outcome ETFs, Innovator Defined Outcome ETFs, 2 pg.
Innovator, Innovator U.S. Equity Buffer ETF, Innovator Defined Outcome ETFs, 4 pgs.
Innovator, How Buffer ETFs Work, Innovator Defined Outcome ETFs, 2 pgs.
Innovator, Understanding How Defined Outcome ETFs rebalance, Innovator Defined Outcome ETFs, 3 pgs.
Innovator, Buffer ETFs, Innovator Defined Outcome ETFs Series, Leading the Defined Outcome ETF Revolution, 12 pgs.
Innovator, Buffer ETFs Overview, Innovator Defined Outcome ETFs, 3 pgs.
Innovator, Tactical Opportunities with Accelerated ETFs, Exchanged-traded funds, 2 pgs.
Innovator, Buffer & Floor Bond ETFs, Innovator Defined Outcome ETFs Series, Leading the Defined Outcome ETF Revolution, 5 pgs.
Innovator, Accelerated ETFs, Innovator Defined Outcome ETFs Series, Leading the Defined Outcome ETF Revolution, 3 pgs.
Innovator, How Accelerated ETFs Work, Innovator Defined Outcome ETFs, 4 pgs.
Innovator, Accelerated ETFs—Why Now?, Innovator Defined Outcome ETFs, 3 pgs.
Innovator, Defined Outcome Investing Without Credit Risk, Innovator S&P 500 Defined Outcome ETFs, 2 pgs.
Innovator ETFs Trust, (Formerly Academy Funds Trust), Form N-1A, Registration Statement Under Securities Act of 1933, Post-Effective Amendment No. 59 and Registration Statement Under the Investment Company Act of 1940, Amendment No. 60, filed with the United States Securities and Exchange Commission on Sep. 8, 2017, 100 pgs.
Innovator ETFs Trust, (Formerly Academy Funds Trust), Form N-1A, Registration Statement Under Securities Act of 1933, Post-Effective Amendment No. 63 and Registration Statement Under the Investment Company Act of 1940, Amendment No. 64, filed with the United States Securities and Exchange Commission on Oct. 19, 2017, 106 pgs.
Innovator ETFs Trust, (Formerly Academy Funds Trust), Form N-1A, Registration Statement Under Securities Act of 1933, Post-Effective Amendment No. 66 and Registration Statement Under the Investment Company Act of 1940, Amendment No. 67, filed with the United States Securities and Exchange Commission on Nov. 7, 2017, 98 pgs.
Innovator ETFs Trust, (Formerly Academy Funds Trust), Form N-1A, Registration Statement Under Securities Act of 1933, Post-Effective Amendment No. 113 and Registration Statement Under the Investment Company Act of 1940, Amendment No. 114, filed with the United States Securities and Exchange Commission on Apr. 13, 2018, 114 pgs.
Innovator ETFs Trust, (Formerly Academy Funds Trust), Form N-1A, Registration Statement Under Securities Act of 1933, Post-Effective Amendment No. 149 and Registration Statement Under the Investment Company Act of 1940, Amendment No. 150, filed with the United States Securities and Exchange Commission on Jul. 12, 2018, 116 pgs.
Asjylyn Loder, How a Chicago Suburb Became a Center of ETFs, Journal Reports: Funds/ETFS, Jul. 8, 2019, 4 pgs., https://www.wsj.com/articles/how-a-chicago-suburb-became-a-center-of-etfs-11562638621?mg=prod/com-wsj.

(56) References Cited

OTHER PUBLICATIONS

Asjylyn Loder, Low-Volatility and 'Buffer' ETFs Draw Billions Amid Jitters Over Market Swings, company, May 28, 2019, 2 pgs., downloaded from https://www.wsj.com/articles/low-volatility-and-buffer-etfs-draw-billions-amid-jitters-over-market-swings-.11559041201?emailToken=1472df5e3e4f17a7cd2b9ad1b620163f3hy2plcGIYf9nXyoNLrBcX9vfQIcBQ/UY+AduGarde+IpZNdL8MP3u9UbH8cJPETniGXYrIK+wAbmxcztzoop0+qFW1hUUUoEXm4piG8fdjcuU3j+QFtJAvNAo/cHdT9ZhOnRRU2ONhiGL7kNREz9w%3D%3D&reflink=article_imessage_share&mg=prod/com-wsi.

David Nadig, Buffered ETFs: A Comprehensive Guide, ETF Trends, Expert Insights, 4pgs., downloaded from https://www.etftrends.com/buffered-etfs-a-comprehensive-guide/.

Innovator, Innovator Celebrates Successful Completion of Initial Outcome Period for Inaugural Launch of Defined Outcome Buffer ETFs, Innovator Capital Management, LLC, Accesswire, Jul. 2, 2019, 9 pgs., downloaded from https://www.accesswire.com/550589/Innovator-Celebrates-Successful-Completion-of-Initial-Outcome-Period-for-Inaugural-Launch-of-Defined-Outcome-Buffer-ETFs.

Innovator, Innovator Pioneers Another First for the ETF Industry, Nov. 1, 2019, 7 pgs., downloaded from https://markets.businessinsider.com/news/stocks/innovator-pioneers-another-first-for-the-etf-industry-1028651522.

Jane Wollman Rusoff, Why PowerShares' Bruce Bond Came Out of Retirement, ThinkAdvisor, Apr. 2, 2019, 12 pgs., downloaded from https://www.thinkadvisor.com/2019/04/02/powershares-founder-bruce-bond-is-backw-with-defined-outcome-etfs/.

Julie Segal, Downside-Protected Funds Go From Hard Sells to Must-Haves, Institutional Investor, Mar. 9, 2020, 3 pgs., downloaded from https://www.institutionalinvestor.com/article/b1kpcg8929gb16/Downside-Protected-Funds-Go-From-Hard-Sells-to-Must-Haves.

Karen Hube, ETFs That Limit Your Losses—for a price, Barron's, Oct. 4, 2019, 2 pgs., downloaded from https://www.barrons.com/articles/etfs-that-temper-fears-for-a-price-51570229742.

Katherine Greifeld, Allianz Launches Two ETFs in Hotly Contested Market Niche (1), Bloomberg News, Jun. 1, 2020, 2 pgs., downloaded from https://www.bloomberg.com/news/articles/2020-06-01/allianz-launches-two-new-etfs-in-hotly-contested-market-niche?sref=rVZwzaNP.

Max Chen, ETFs with a Built-In Downside Buffer Are Working as Intended, ETF Trends, Innovative ETFs Channel, Jul. 22, 2019, 2 pgs., downloaded from https://www.etftrends.com/innovative-etfs-channel/etfs-with-a-built-in-downside-buffer-are-working-as-intended/.

Robert Huebscher, Why Defined-Outcome Products are Dominating ETF Flows, 8 pgs., downloaded from https://www.advisorperspectives.com/articles/2020/06.05/wny-defined-outcome-products-are-dominating-etf-flows.

Petcher, K.: It's Hot Around the "Collar", Mar. 29, 2018, Retirement Income Journal, pp. 1-9. (Year: 2018).

Innovator Capital Management (ICM): Innovator Defined Outcome ETFs: How Buffer ETFs Work, 2021, pp. 1-2. (Year: 2021).

\* cited by examiner

| | 1 Year | 3 Years | 5 Years | 10 Years |
|---|---|---|---|---|
| Although your actual costs may be higher or lower, your costs, based on these assumptions, would be: | $81 | $252 | $439 | $978 |

FIG. 3

| Layer | Label | Position | Index | Strike | Expiration |
|---|---|---|---|---|---|
| 1 | (a) | Purchased call option | S&P 500 Price Index | Less than 100% | Final day of Outcome Period (June 30) |
| 1 | (b) | Sold put option | S&P 500 Price Index | Less than 100% | Final day of Outcome Period (June 30) |
| 1 | (c) | Purchased put option | S&P 500 Price Index | Greater than 100% | Final day of Outcome Period (June 30) |
| 1 | (d) | Sold call option | S&P 500 Price Index | Greater than 100% | Final day of Outcome Period (June 30) |
| 2 | (e) | Sold put option | S&P 500 Price Index | Less than 100% | Final day of Outcome Period (June 30) |
| 2 | (f) | Purchased put option | S&P 500 Price Index | 100% | Final day of Outcome Period (June 30) |
| 3 | (g) | Sold call option | S&P 500 Price Index | Determined at beginning of Outcome Period | Final day of Outcome Period (June 30) |

| | | |
|---|---|---|
| Layer 1 | Upside S&P 500 Price Index Participation | The first layer involves buying and selling calls and puts (a), (b), (c), and (d), at pre-determined strikes to provide the desired S&P 500 Price Index participation. |
| Layer 2 | Downside Buffer | The second layer involves buying and selling puts (e) and (f). Together they produce the downside buffer. |
| Layer 3 | Upside Cap | The final layer involves selling a call (g), which creates the upside cap. The strike price at which (g) is sold is determined so that the combined net options purchase price is approximately equal to the Fund's net asset value, as illustrated in the figure below. |

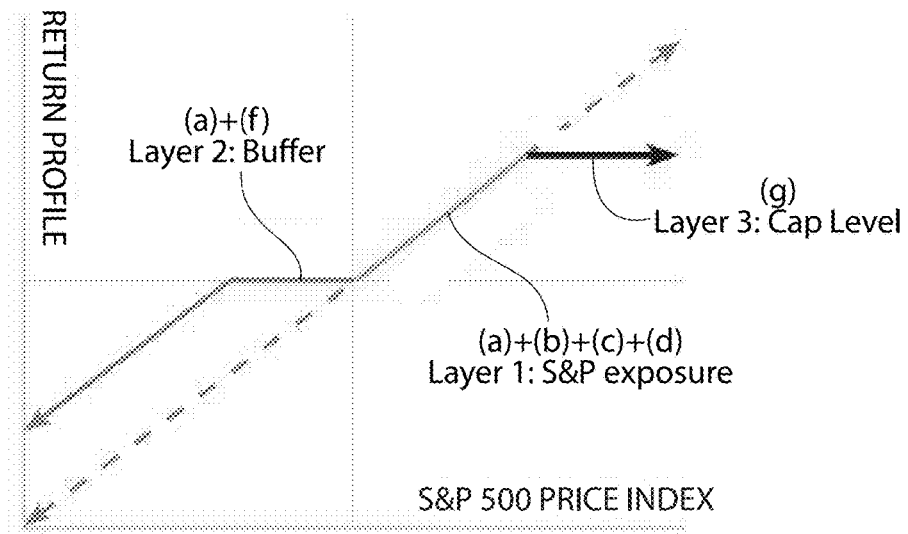

FIG. 5A

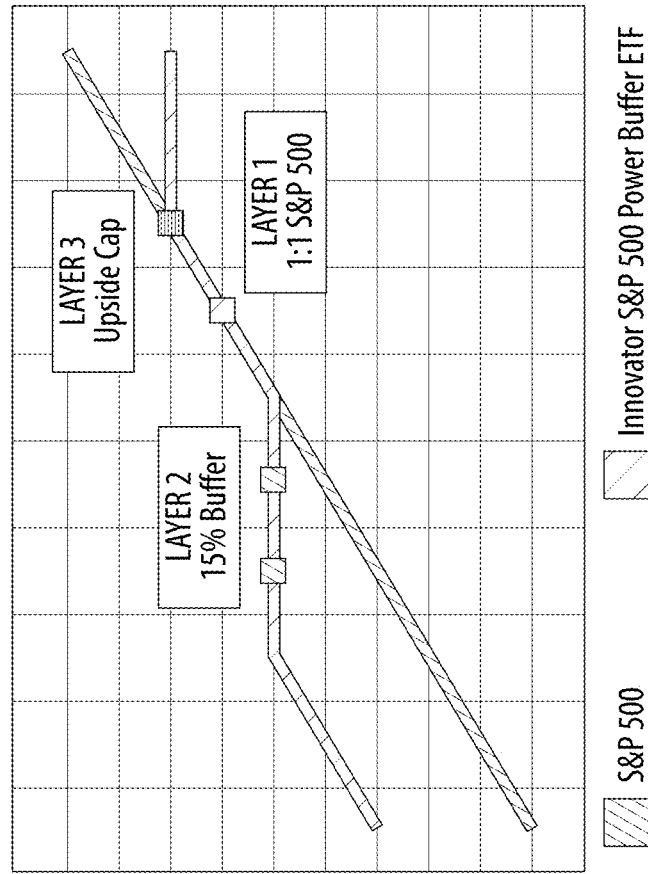
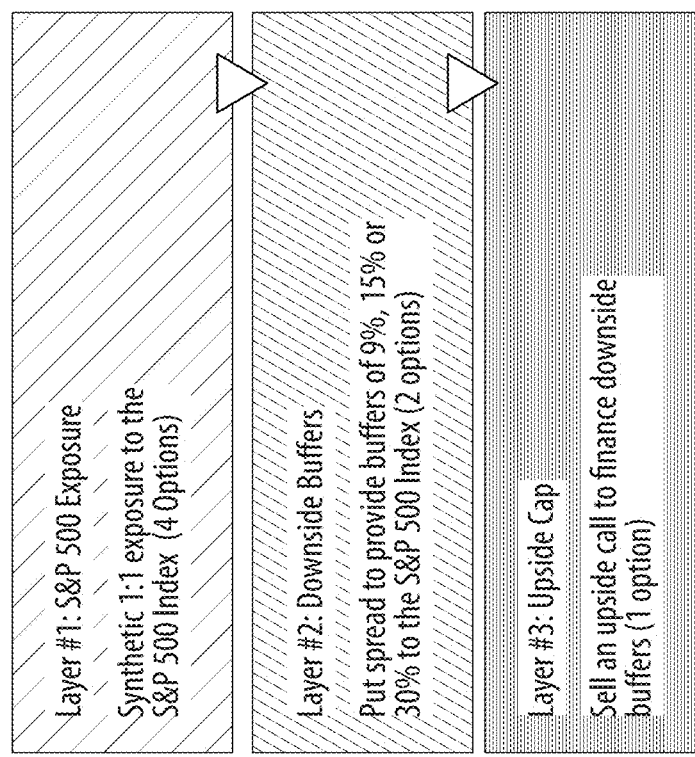
FIG. 5B

| | Period Ended October 31, 2018[3] |
|---|---|
| Per share operating performance (For a share outstanding throughout each period) | |
| Net asset value, beginning of period | $ 25.17 |
| Operations: | |
| Net investment income/(loss) | (0.04) |
| Net realized and unrealized gain/(loss) | (0.39) |
| Total from investment operations | (0.43) |
| Capital share transactions: | |
| Transaction fees | 0.01 |
| Change in net asset value for the period | (0.42) |
| Net asset value, end of period | $ 24.75 |
| Total return | (1.68)%[2] |
| Ratios/supplemental data: | |
| Net assets, end of period (000) | $ 3,712 |
| Ratio of net expenses to average net assets [4] | 0.79%[1] |
| Ratio of net investment income/(loss) to average net assets | (0.79)%[1] |
| Portfolio turnover rate | 0%[2] |

(1) Annualized.
(2) Not annualized.
(3) Since Commencement of Operations on August 7, 2018.
(4) Does not include the impact of the expenses of the underlying funds in which the Fund invests.

SYSTEM AND METHOD FOR MANAGING DATA FOR DELIVERING A PRE-CALCULATED DEFINED INVESTMENT OUTCOME IN AN EXCHANGE-TRADED FUND

CROSS-REFERENCE TO RELATED APPLICATIONS

This application is a continuation of U.S. patent application Ser. No. 17/721,260 filed Apr. 14, 2022, now U.S. Pat. No. 11,734,765 issued Aug. 22, 2023, which is a continuation of U.S. patent application Ser. No. 16/930,150 filed Jul. 15, 2020, now U.S. Pat. No. 11,334,950 issued May 17, 2022, which claims the benefit of U.S. Provisional Patent Application No. 62/874,495 filed Jul. 15, 2019 entitled "System And Method For Offering Structured Defined Outcome Investing In An Exchanged-Traded Fund", each of which is incorporated by reference herein in its entirety.

BACKGROUND OF THE INVENTION

In the financial industry globally, there are many structures and pooled vehicles used to pursue or achieve investment outcomes. For individual "retail" investors, this may include putting their money for investment into mutual funds or into an account to be professionally managed by an investment adviser. For institutions or more sophisticated investors, additional investing options may be made available, such as structures products, bank-issued notes, and annuities.

The stated objective of an investment product, that is, to achieve some kind of performance or result, can, for example, be based on an investment methodology or can track the relative performance of an index. An investment product could hold all the stocks represented in the S&P 500 index and generally match the performance of those holdings and the index value went up or down. Another could be a strategy which seeks to lessen the impact of losses due to downturns in the investments, like providing a "buffer" or floor to losses beyond a certain point. This is why any investor today can likely find a fund or a strategy which meets their targeted investment objectives and personal investment risk appetite.

As the number of offerings of investing objectives has greatly expanded, so too has the number of investment vehicles available to deliver those strategies. While mutual fund may be the most common structure known to investors, other vehicles may be adapted and adjusted to offer similar investment strategies. For example, if an investment manager has a successful investment methodology for delivering higher investment performance trading large cap US equity securities in a client account, their strategy might also then be offered to investors in the form of a mutual fund or a structured note.

A structured note, also sometimes referred to as a structured product, are debt obligations where an issuer, typically a global bank, ties the investor's desired investment outcome to a particular benchmark or index. Because these instruments are more flexible than registered product such as mutual funds, the issuer can have more flexibility in the investment strategies being offered, such as higher concentration in holding certain securities, such as options or other derivatives. As such, structured products were initially a place where a sophisticated investor could seek to obtain a definitive investment profile, like protection against downside investment performance losses.

However, structured notes as a product have many obvious limitations or risks to investors. First, structured notes concentrate all the credit risk to one counterparty issuer. As these notes are unsecured debt obligations, the investor could lose a significant amount or all of their investment in an issuer default. Second, these notes are issued directly and do not typically have a secondary pricing market, which can impair the pricing and redemption value of the investment, typically resulting in a discount to value by the issuer when seeking to exit the investment. Third, since these products are obligations for a fixed term, they must also be liquidated and unwound after their term, sometimes at a discount to value, including the resulting impact of costs and taxes to investors. Last, as these products are not registered products, they may also lack the disclosures, accountability and transparency that other financial products may provide, such as with mutual funds.

In the US, a mutual fund is a pooled investment structure which is registered with the US Securities and Exchange Commission ("SEC") and offered to the investing public. Generally structured as a corporate entity, like a state registered business trust, mutual funds are a series of sub-portfolios of that trust, each recognized as separate funds on one platform for tax and liability purposes.

According to the definitions of the SEC, a mutual fund is an open-end investment company or fund. An open-end fund is one of three basic types of investment companies. The other two types of investment companies are closed-end funds and unit investment trusts (UITs). Exchange-traded funds (ETF or ETFs) are generally also structured as open-end funds, yet have several structural distinctions from those of a mutual fund.

A mutual fund continuously pools money from many investors and invests the money in stocks, bonds, money market instruments, other securities, or even cash.

Below are some of the traditional and distinguishing characteristics of open-end mutual funds:

a. Mutual funds generally sell and purchase their shares on a continuous basis, although some funds will stop selling when, for example, they reach a certain level of assets under management.

b. Investors purchase shares in the mutual fund from the fund itself, or through a broker for the fund. Investors cannot purchase the shares from other investors on a secondary market, such as the New York Stock Exchange or Nasdaq Stock Market. The price that investors pay for mutual fund shares is the fund's current net asset value (NAV) per share plus any fees that the fund may charge at purchase, such as sales charges or loads.

c. Mutual fund shares are redeemable. This means that when mutual fund investors want to sell their fund shares, they sell them back to the fund or to a broker acting for the fund. Investors sell their shares at the current NAV per share, minus any fees the fund may charge at redemption, such as deferred sales loads or redemption fees.

d. Mutual funds are registered with the SEC and subject to SEC regulation. In addition, the investment portfolios of mutual funds typically are managed by separate entities known as investment advisers that are also registered with the SEC.

There are many varieties of mutual funds, including, stock funds, bond funds, and money market funds. Some mutual funds are index funds and other are actively managed. Each may have a different investment objective and strategy and a different investment portfolio. Different mutual funds may also be subject to different risks, volatility, and fees and expenses. Fees reduce returns on fund investments and are an important factor that investors should consider when buying mutual fund shares.

The form and structure of the delivery vehicle for the invention is an open-end fund in the form of an exchange-traded fund ("ETF" or "ETFs"), the basic features of which are well known in the industry. ETFs are a form of investment vehicle that were first introduced to the U.S. markets in 1993. The initial ETFs, called Standard and Poor's Depositary Receipts ("SPDRs"), under the ticker symbol "SPY", were a unit trust designed to track and match the performance of the S&P 500 index. Since 1993, the creation and trading of ETFs in the U.S. and international markets has grown exponentially. According to ETFGI, as of April 2019 the global ETF industry had over 7,774 exchange-traded products from 412 ETF sponsors listed on 71 exchanges in 58 countries, accounting for $5.57 trillion USD.

Descriptions of some types of such exchange-traded funds may also be found in prior publications such as U.S. Pat. Nos. 6,879,964 and 7,865,426. The entire disclosures of U.S. Pat. Nos. 6,879,964 and 7,865,426 are incorporated herein by reference.

By comparison, an ETF is recognized as several features which generally make it more desirable to investors than investing in a mutual fund, Those features include being relatively cheaper and easier to invest in an ETF, full transparency on the value of the investments held by the ETF (as these are daily posted publicly for all investors, and can be tracked during trading hours to see the real-time value), the ability to buy and sell shares of an ETF throughout the day, and, importantly, the tax efficiency of ETFs both for the fund and for investors to avoid capital gains, double taxation, or redemption fees and other adverse tax impacts resulting from shareholder movement.

Despite tremendous growth and continued interest in ETF investing, there remains a need for an alternative and improved ETF investing model and methodology for creating and trading ETFs that address the needs of investors seeking defined outcomes in ETF investing, yet overcome the deficiencies of the current models and methodologies, and lack of options available in the investment marketplace.

Prior to 2020, to create and offer ETFs in the U.S. market a registered investment adviser would have to request and receive exemptive relief directly from SEC. That approval process required a lengthy review process of the design and qualifications of both the potential ETF sponsor (the asset manager), and of the particular fund to be an ETF. As a design-side exercise, the Applicant had to invest significant resources and time to design and accomplish an entirely new product structure and process to meet the SEC's standards for the type of new ETFs. However, at the date of the effective filing of this Application (Jul. 15, 2019), the Applicant was the first and only investment manager which had received the requisite regulatory approval from the SEC to issue and offer Defined Outcome ETFs™, which required utilizing the model and methodology of the invention as described in this application. That SEC approval granted to the Applicant was conditioned upon the meeting and delivering of certain key elements, which is inclusive of those elements which are described herein as the invention.

Improvements were needed in the field of open-end funds, and even more so to deliver a defined investment outcome in the transparent and tax-efficient ETF structure been available to investors in ETFs prior to the invention. Given the added complexity of managing an investment strategy within the required parameters of an ETF can many times discourage an active investment manager from attempting to replicate their strategy within an ETF structure. If that strategy also was intended to follow a complicated strategy, such as one utilizing options, that multilayered operational and regulatory complexity could prove insurmountable for some managers.

Options are not securities but financial derivatives which give buyers of those contracts the right, but not the obligation, to buy (or "call") or sell (a "put") an underlying asset at an agreed-upon price and future date. Options strategies can be implemented in different manners for differing objectives, depending on the investor and the desired investment outcome. For example, a fund could use options in a designed investment strategy to achieve a certain return profile (e.g., a portion of upside performance benchmarked to an index), perhaps with a pre-determined limit on their loss of value on the investment, much like a "buffer". A 'buffer' strategy is one in which the investor's principal preservation, either in full or for some measured portion of the investment return, is a key deliverable of the investment strategy.

"Defined outcome" strategies seek to produce pre-determined investment outcomes based upon the performance of an underlying security or index. A defined outcome investment experience may or may not also provide a buffer against certain losses for investors, and a buffer fund may or may not also provide a pre-determined investment outcome or payoff profile. For example, some prior funds have included an option overlay of the underlying investment strategy as a nominal hedge to loss, but might be limited and uncertain.

There have been mutual funds who have provided some form of downside protection or buffer before, but those have generally not also provided both of these investment objectives together in one investment structure. There have previously been recognized limits to how an investment manager could deliver a defined outcome for investors as well.

Prior to the invention, investment managers seeking to deliver defined outcome to their investor clients had limited options, with limited successes. Certainly, an adviser could manage a single account, for a particular time duration, directly for one client. To the extent this would be a good payoff profile for a single investor despite the expenses and risks, the costs and design aspects of a single managed account would limit the scale or scope of providing the same for multiple investors at once.

Further, managers have also sought to deliver defined and targeted outcomes in the form of a structured note or insurance-related product, such as an annuity contract. These arrangements included the concentrated issuer credit risk, prolonged lock-ups, lack of market valuation or transparency and heavy costs related to similar notes and contracts.

Pooled versions of a defined outcome investment strategy have previously been attempted by some asset managers in the form of offering a unit investment trust (UIT). While this allows the manager to deliver an investment outcome for several investments at once, UITs can be very expensive to investors, and are not dynamic in investment nature (i.e., the UIT purchases a position on day one, and holds it over a duration period). While this may create an effective yet inefficient investment horizon for the investor, one primary disadvantage of a UIT also includes that, like a note, they terminate at a date certain (e.g., at eleven months). This can frequently result in adverse tax consequences to investors for holding to the end of the brief investment period, while experiencing the higher impact of tax and costs at the time of termination.

Thus, in the financial industry there had never been an attempt, much less a successful one, to gather all those objectives and to deliver those in an ETF structure. At the time the Applicant designed and successfully managed a listed ETF based on the invention, no investment product and integrated proprietary process had ever been accomplished to deliver an ETF, with all the advantages and benefits of this structure, with a buffered investment protection, with a automatically resetting perpetual defined outcome profile for the investors.

The present invention specifically relates to systems, methods, and processes for offering financial securities funds in a manner which has never been achieved before the invention. Most importantly, prior attempts to provide investors with a comparable "defined outcome" (providing an investor with a set investment result over a period of time relative to the movement of an underlying reference asset, such as the performance of an index) were only made available via other vehicles or structures exclusive of ETFs, such as being offered in a structure product (e.g., a bank-issued note) or variable annuity contract.

Thus, the complex integration of layered investment outcomes—an investment return profile which both delivers a targeted outcome over a certain period of time, with a benefit to the investor of protecting against a calculated level of losses on the investment, and offered within the advantages of the ETF vehicle—are now accomplished in the embodiment of the investment. It is that technology enhanced structure plus process which is the heart of the invention.

SUMMARY OF THE INVENTION

Embodiments of the present invention are directed to a computer-based apparatus for managing data based on performance of an underlying securities index including a memory element of a computer configured to store computer executable instructions and a processor for the computer, configured to execute the computer readable instructions to receive information on a lower buffer threshold against losses for an investment, and determine a total return on the investment during an outcome period, wherein the total return is adjusted to fall above the buffer threshold.

In some embodiment, the processor is further configured to execute the computer readable instructions to receive information on a maximum return cap for the investment, and wherein the total return is further adjusted to fall below the maximum return cap.

In some embodiment, the processor is further configured to execute the computer readable instructions to render, on a user interface, a dynamic tool associated with information related to the investment and receive, on the user interface, an input and updating the dynamic tool based on the input.

Another embodiment of the present invention provides a computer-based method for managing data based on performance of an underlying securities index, the method including storing computer executable instructions in a memory element of a computer and executing, using a processor for the computer, the computer readable instructions to receive information on a lower buffer threshold against losses for an investment, and determine a total return on the investment during an outcome period, wherein the total return is adjusted to fall above the buffer threshold.

In some embodiment, the method further includes executing the computer readable instructions to receive information on a maximum return cap for the investment and wherein the total return is further adjusted to fall below the maximum return cap.

In some embodiments, the method further includes executing the computer readable instructions to receive information on a maximum return cap for the investment, and wherein the total return is further adjusted to fall below the maximum return cap, and wherein upon the completion of a stated outcome period, automatically determining return profile terms, along with refreshed caps and values, for a next defined outcome duration period and automatically implementing the return profile terms.

In some embodiments, the method of the present invention, rather than terminating and closing upon the completion of a stated outcome period (with redemptions and potential taxable events to investors), automatically determines the return profile terms, along with refreshed caps and values, for the next defined outcome duration period and automatically implements that, and the investor remains fully invested in the investment fund as the investment fund continues perpetually, with the terms and values of the refreshed and reset defined outcome for that investment fund, as a result of the invention.

The invention provides methods and systems for offering ETFs that provide a protective "buffer" for investors from downside losses on their investments in the embodiment ETF (here, "Fund" or "the ETF"), along with the defined outcomes the investors want. That is, if an investor invests in the Fund they know at the date of investment what their potential upside could be, but also are afforded a buffer of protection against certain pre-defined loss amounts over a specified period of time. The ETFs developed herein utilize an investment return "cap" on the top end of the investment returns as a feature. In different embodiments, the method and system provide ETFs that may be offered with varying levels of buffer protection for investors to select (i.e., buffers against losses of ~9%, ~15%, from −5% to ~35%, or some determined amount up to 100%). In some embodiments, the ETFs provided under the method and system utilize "FlexOptions" (here, customized option contracts written by the Cboe exchange) to achieve the predetermined investment results. These options, themselves exchange-traded, are written on published indexes for a pre-determined duration.

Each of the ETFs offered under this method and system have a set duration period (in the initial embodiment, 12 months or potentially less, if that particular fund has been initially launched less than 12 months from the target date) for the applicable terms of the cap rates. However, unlike any other ETF or financial products, at the end of that stated outcome period, the ETF itself does not terminate, but instead re-sets its cap rates and refreshes the downside buffer for the next applicable 12 months. Under the method and system, the key terms of these ETFs (the top-end cap rates for upside investment and the duration term) each reset at the end of the stated duration periods.

Another key aspect of the model and methodology of the invention, which is unique from any other ETF to date, is that it does not reset its options daily or weekly, like some ETFs currently offered, but instead at targeted twelve-month periods (in its initial embodiment).

The resulting, unique benefit of the invention to the investor is (i) access to this strategy in a manner not otherwise made available to the general public; (ii) the ability to access and investment fund which provides certainty of targeted outcome returns; (iii) the ability within an investment fund to access defined outcomes, with options available to adjust for risk profiles and duration; (iv) the continuity of the Fund which reset beyond initial outcome periods, allowing the investor to stay invested without the disruption and potential adverse tax implications of a note or financial product which otherwise terminates at the end of the target outcome date; (v) the ability for the retail public to invest in the strategy without the investor downsides and restrictions of obtaining that strategy via a structured product or annuity; and (vi) for the benefit of the investor, maximizes the value of all these key aspects of the invention in a ETF structure by further providing (a) lower costs relative to other vehicles accessing the strategy, both in the subscription/redemption in and out of the Fund (e.g. no loads) and fees during the period of investment (e.g., lower management fees and costs, no adverse shareholder redemption impact to remaining investors), (b) daily transparency in Fund values and holdings, even with intraday indicative values made public for the benefit of investors and prospective investors; and (c) the benefit of exchange-traded market arbitrage to keep Fund pricing competitive.

BRIEF DESCRIPTION OF THE DRAWINGS

For a better understanding of the various described implementations, reference should be made to the Detailed Description of implementations below, in conjunction with the following drawings in which like reference numerals refer to corresponding parts throughout the figures.

FIG. 3 is a comparison of the cost of investing in the exemplary fund with the cost of investing in other funds.

FIG. 5A is an illustration of the combination of FLEX Options (a)+(b)+(c)+(d) providing upside participation that matches that of the S&P 500 Price Index.

FIG. 5B is a graph illustrating exemplary layers of the exemplary fund.

FIG. 6 is an example of financial performance of the exemplary fund operating in an exemplary application of the method and system.

FIGS. 10A and 10B are illustrations of exemplary outcome tools associated with the exemplary fund.

DETAILED DESCRIPTION OF THE INVENTION AND CERTAIN PREFERRED EMBODIMENTS

Figure 1:
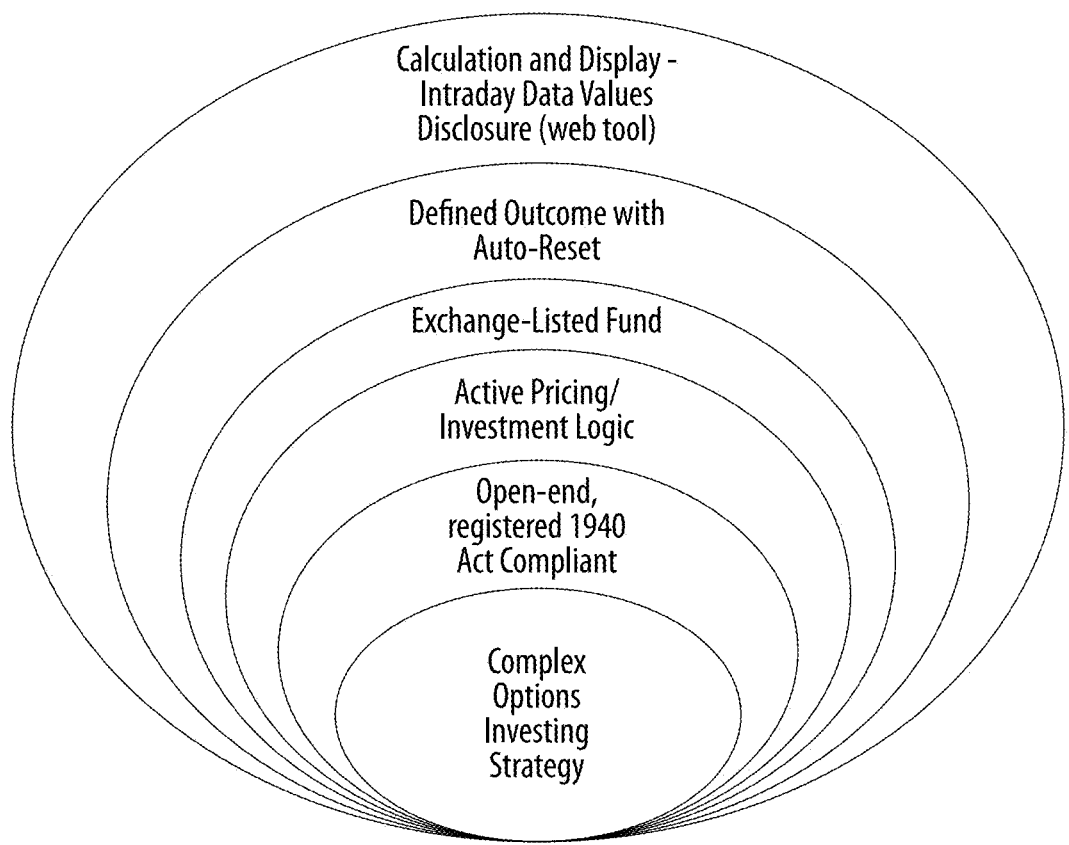
FIG. 1 is an illustration of the overlapping concepts related to financial securities of the present invention.

Using the system and method, in its initial embodiment the inventors have created an exemplary fund (hereinafter also referred to as the "Fund"). While investment in defined outcome strategies may otherwise be offered to potential investors in a structured note (including exchange-traded notes), for example, the Fund is the first and only to offer this strategy in an ETF which qualifies as an open-end "registered investment company", as that term is defined under the Investment Company Act of 1940, as amended, and the Internal Revenue Code.

The Fund invests substantially all of its assets in FLexible EXchange® Options ("FLEX Options") on the S&P 500 Price Return Index ("S&P 500 Price Index"). FLEX Options are customizable exchange-traded option contracts guaranteed for settlement by the Options Clearing Corporation. The Fund uses FLEX Options to employ a "defined outcome strategy." The pre-determined outcomes sought by the Fund, which include the buffer and cap discussed below ("Outcomes"), are based upon the performance of the S&P 500 Price Index over a set time period. In an exemplary application of the system and method, the time period is a one-year period, e.g., Jul. 1, 2019 through Jun. 30, 2020. This period is referred to as the "Outcome Period." Following the conclusion of the Outcome Period, another approximately one-year outcome period, for example, from July 1 to June 30, will begin. The Fund will not terminate after the conclusion of the Outcome Period. After the conclusion of the Outcome Period, another will begin. While the newly stated Outcome Periods are made public to current and potential investors in the Fund, there is no guarantee that the Outcomes for an Outcome Period will be realized to each applicable investor. This may also be true for those investors exiting the Fund prior to the maturity of the Outcome Period, or for those investing at some other period during the Outcome Period (as noted below).

In its initial embodiment the Fund's strategy has been specifically designed to produce the Outcomes based upon the S&P 500 Price Index's returns over the duration of the Outcome Period. The Outcomes may only be realized if the fund shareholder is holding shares on the first day of the Outcome Period and continues to hold them on the last day of the Outcome Period. If the fund shareholder purchases shares after the Outcome Period has begun or sells shares prior to the Outcome Period's conclusion, the shareholder may experience investment returns very different from those that the Fund seeks to provide.

In its initial embodiment Fund shareholders are subject to an upside return cap (the "Cap") that represents the maximum percentage return an investor can achieve from an investment in the Fund for the Outcome Period. Therefore, even though the Fund's returns are based upon the S&P 500 Price Index, if the S&P 500 Price Index experiences returns for the Outcome Period in excess of the Cap, the shareholder will not experience those excess gains. The Cap is set on the first day of the Outcome Period and is, in an example, 8.88%, prior to taking into account any fees or expenses charged to shareholders. When the Fund's annual Fund management fee of 0.79% (as an example) of the Fund's average daily net assets is taken into account, the Cap is 8.09% (as an example). The Cap will be further reduced by any shareholder transaction fees and any extraordinary expenses incurred by the Fund. Please note, if the Outcome Period has begun and the Fund has increased in value to a level near to the Cap, an investor purchasing at that price has little or no ability to achieve gains but remains vulnerable to downside risks. Additionally, the Cap may rise or fall from one Outcome Period to the next. There is no guarantee that the Cap will remain the same upon the conclusion of the Outcome Period.

The Fund only seeks to provide shareholders that hold shares for the entire Outcome Period with a buffer against the first 15% (as an example) of S&P 500 Price Index losses (based upon the value of the S&P 500 Price Index at the time the Fund entered into the FLEX Options on the first day of the Outcome Period) during the Outcome Period. A fund shareholder will bear all S&P 500 Price Index losses exceeding 15% (as an example) on a one-to-one basis. The buffer is provided prior to taking into account annual Fund management fees equal to 0.79% (as an example) of the Fund's daily net assets, transaction fees and any extraordinary expenses incurred by the Fund. A shareholder that purchases shares at the beginning of the Outcome Period may lose their entire investment. While the Fund seeks to limit losses to 85% (as an example) for shareholders who hold shares for the entire Outcome Period, there is no guarantee it will successfully do so. Depending upon market conditions at the time of purchase, a shareholder that purchases shares after the Outcome Period has begun may also lose their entire investment. For instance, if the Outcome Period has begun and the Fund has decreased in value beyond the predetermined 15% buffer (as an example), an investor purchasing shares at that price may not benefit from the buffer.

Similarly, if the Outcome Period has begun and the Fund has increased in value, an investor purchasing shares at that price may not benefit from the buffer until the Fund's value has decreased to its value at the commencement of the Outcome Period.

Although the Fund seeks to achieve its investment objective, there is no guarantee that it will do so. The returns that the Fund seeks to provide do not include the costs associated with purchasing shares of the Fund and certain expenses incurred by the Fund. The Fund has characteristics unlike many other traditional investment products.

A key aspect of the model and methodology of the invention includes the unique and improved system for pricing and valuing the Fund, both intraday and in connection with the resetting of the caps at the end of the Outcome Period.

Investment Objective

In an exemplary application of the method and system, the Fund will seek to provide investors with returns that match those of the S&P 500 Price Index, up to the upside cap of, e.g., 8.88% (prior to taking into account management fees and other fees) and, e.g., 8.09% (after taking into account management fees and other fees), while providing a buffer against the first 15%, e.g., of S&P 500 Price Index losses, over a one year period, in this example, from Jul. 1, 2019 to Jun. 30, 2020.

Fees and Expenses of the Fund

Figure 2:
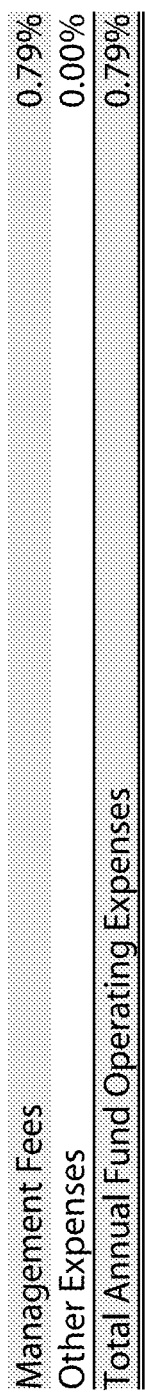
FIG. 2 is an exemplary table describing examples of the fees and expenses that a fund shareholder may pay if the shareholder buys and holds shares of an exemplary fund.

FIG. 2 is a table describing examples of the fees and expenses that a fund shareholder may pay if the shareholder buys and holds shares of the Fund ("Shares"). Investors may pay brokerage commissions on their purchases and sales of Shares, which are not reflected in the table or the example below.

Annual Fund Operating Expenses (expenses that shareholders pay each year as a percentage of the value of the investment)

Referring to FIG. 3, the table is intended to help an investor compare the cost of investing in the Fund with the cost of investing in other funds. This example assumes that the investor invests $10,000 in the Fund for the time periods indicated and then sells all of the investor's Shares at the end of those periods. The example also assumes that the investment has a 5% return each year and that the Fund's operating expenses remain at current levels. This example does not include the brokerage commissions that investors may pay to buy and sell Shares.

Key Impacts of Offering Investment within the ETF Structure

As a result of providing investors defined outcomes with a buffer within an ETF structure, the invention delivers this return profile to the investor with several key aspects inclusive of the following features: (i) no tiered or "institutional investor" level pricing to disqualify investor access; there is only one "clean" share class made available, at one lower price; (ii) the unitary fee charged by the ETF generally is materially lower than the fees and costs charged by other products accessing the strategy (e.g., annuities, notes), thus permitting greater access by the investing public; (c) access to the strategy via the ETF does not come with a front-end or backend load or charge (e.g. 12b-1 load), and likewise does not charge redemption fees of the investor when redeeming Fund shares (although an investor's own brokerage fees to trade may apply); and (d) unlike any other vehicle or model offering the defined outcome strategy to investors, the ETF provides transparent pricing to the public daily, along with the Fund's holdings, with intraday indicative values of the Fund also being made available.

Portfolio Turnover

In an exemplary application of the method and system, the Fund pays transaction costs, such as commissions, when it purchases and sells securities (or "turns over" its portfolio). A higher portfolio turnover will cause the Fund to incur additional transaction costs and may result in higher taxes when Shares are held in a taxable account. These costs, which are not reflected in Total Annual Fund Operating Expenses or in the example, may affect the Fund's performance. During the fiscal period ended Oct. 31, 2018, for example, the Fund's portfolio turnover rate was 0% of the average value of its portfolio, excluding the value of portfolio securities received or delivered as a result of the Fund's in-kind creations and redemptions.

Principal Investment Strategies

General Strategy Description

In an exemplary application of the system and method, the Fund invests at least 80% of its net assets in FLexible EXchange® Options ("FLEX Options") that reference the S&P 500 Price Return Index ("S&P 500 Price Index"). FLEX Options are exchange-traded options contracts with uniquely customizable terms. Although guaranteed for settlement by the Options Clearing Corporation (the "OCC"), FLEX Options are still subject to counterparty risk with the OCC and may be less liquid than more traditional exchange-traded options. Due to the unique mechanics of the Fund's strategy, the return an investor can expect to receive from an investment in the Fund has characteristics that are distinct from many other investment vehicles.

In general, an option contract is an agreement between a buyer and seller that gives the purchaser of the option the right to buy or sell a particular asset at a specified future date at an agreed upon price. In an exemplary application of the method and system, the reference asset for all of the Fund's FLEX Options is the S&P 500 Price Index, a large-cap, market-weighted, U.S. equities index that tracks the price (excluding dividends) of the 500 leading companies in leading industries.

In an exemplary application of the method and system, the pre-determined outcomes sought by the Fund, which include the buffer and Cap discussed below, are based upon the performance of the S&P 500 Price Index over a one year period, in this example, the period of Jul. 1, 2019 through Jun. 30, 2020. This period is referred to as the "Outcome Period." Following the conclusion of the Outcome Period, another approximately one-year outcome period during the following July 1 to June 30 will begin. In the event that the S&P 500 Price Index experiences gains over the Outcome Period, the strategy under the method and system seeks to provide investment returns that match the performance of the S&P 500 Price Index, up to an upside return cap that represents the maximum percentage return an investor can achieve from an investment in the Fund for the Outcome Period (the "Cap"). In an exemplary application of the method and system, the Cap is set on the first day of the Outcome Period and is, e.g., 8.88% prior to taking into account any fees or expenses charged to shareholders. When the Fund's annual Fund management fee of, e.g., 0.79% of the Fund's average daily net assets is taken into account, the Cap is, e.g., 8.09%. The Cap will be further reduced by any shareholder transaction fees and any extraordinary expenses incurred by the Fund. The date stipulated in all of the Fund's FLEX Options is the approximate termination date of the Outcome Period, at which time the Fund will invest in a new set of FLEX Options for the next Outcome Period.

In an exemplary application of the method and system, the Fund may involve engagement of an investment sub-adviser (the "Sub-Adviser"), who may construct a portfolio principally composed of, e.g., seven FLEX Options on the S&P 500 Price Index that are each set to expire on the last day of the Outcome Period. The customizable nature of FLEX Options allows the Sub-Adviser to select the price at which the S&P 500 Price Index will be exercised at the expiration of each FLEX Option. This is commonly known as the "strike price." At the commencement of the Outcome Period, the Sub-Adviser may specifically select the strike price for each FLEX Option such that when the FLEX Options are exercised on the final day of the Outcome Period, the Outcomes may be obtained, depending on the performance of the S&P 500 Price Index over the duration of the Outcome Period.

Figure 4:
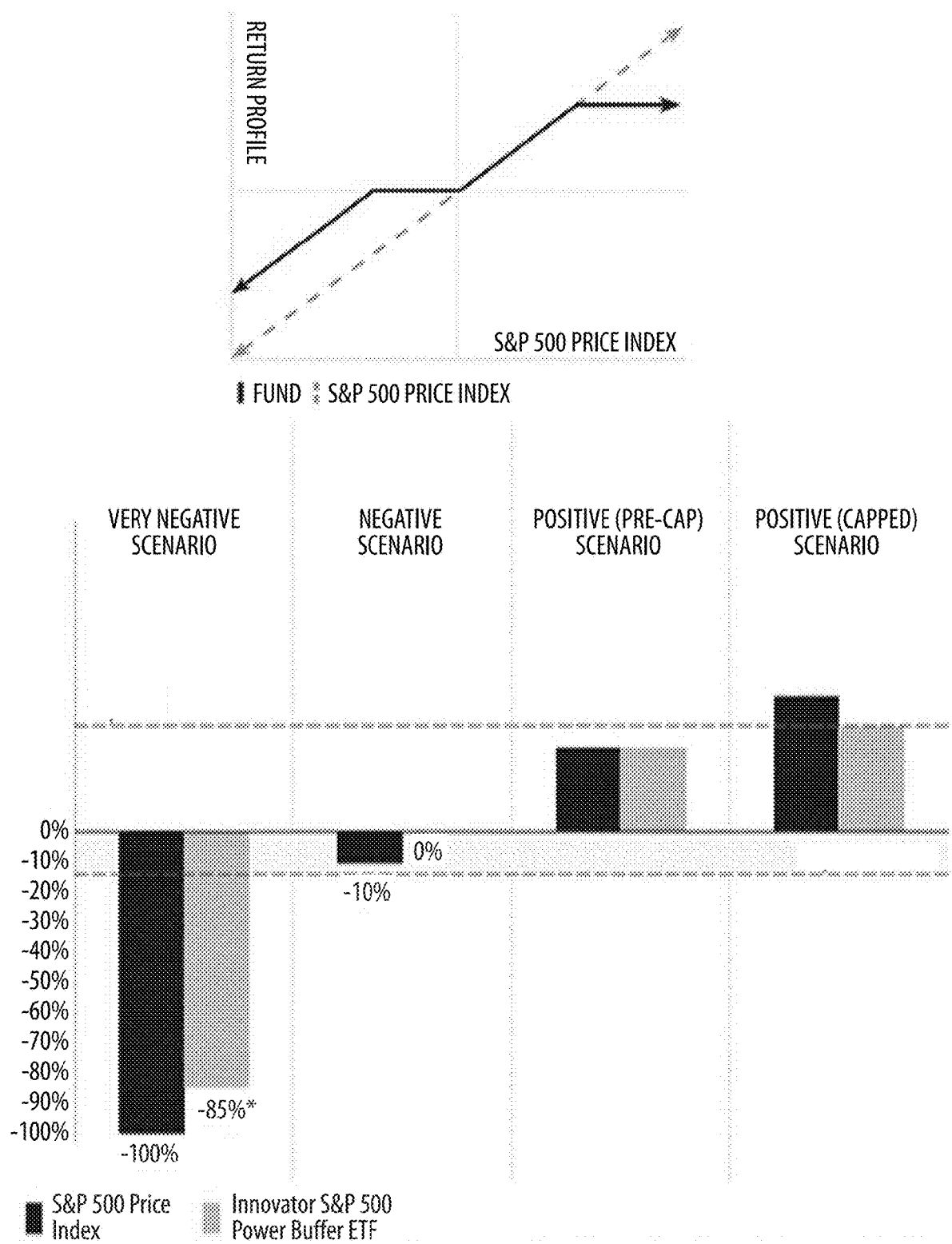
FIG. 4 is an illustration of exemplary outcomes based upon a hypothetical performance of the S&P 500 Price Index for a shareholder that holds the exemplary fund for the entirety of the Outcome Period.

In an exemplary application of the method and system, the Fund will seek to generate returns that match the S&P 500 Price Index, up to the Cap (discussed in detail below), while limiting downside losses. The two hypothetical graphical illustrations provided in FIG. 4 illustrate the Outcomes based upon the hypothetical performance of the S&P 500 Price Index for a shareholder that holds Shares for the entirety of the Outcome Period.

Use of FLEX Options

In an exemplary application of the method and system, the Outcomes may be achieved by purchasing and selling call and put FLEX Options to create layers within the Fund's portfolio. One layer is designed to produce returns that match those of the S&P 500 Price Index for the Outcome Period if the S&P 500 Price Index has experienced gains during that time. To achieve these returns, the method and system comprise features wherein the Fund will purchase a call option (giving the Fund the right to receive the cash value of the S&P 500 Price Index) and a put option (giving the Fund the right to deliver the cash value of the S&P 500 Price Index), while simultaneously selling a call option (giving the Fund the obligation to deliver the cash value of the S&P 500 Price Index) and a put option (giving the Fund the obligation to receive the cash value of the S&P 500 Price Index). Each of these FLEX Options has a specifically selected strike price. The effect created by these four positions is that if the S&P 500 Price Index has increased in value over the course of the Outcome Period, when the amount of cash the Fund receives and delivers pursuant to the terms of its positions is netted out, the Fund seeks to provide a gain that matches the gain experienced by the S&P 500 Price Index. This gain is subject to the Cap, a maximum investment return level, which is discussed below.

In an exemplary application of the method and system, a separate layer is designed to produce the Fund's "power" buffer. "Power" denotes the Fund's objective to provide returns that are buffered by up to, for example, 15%, if the S&P 500 Price Index experiences a loss during the course of the Outcome Period. There is no guarantee that the Fund will be successful in its attempt to provide buffered returns. The buffer that the Fund seeks to provide is only operative against the first 15%, e.g., of S&P 500 Price Index losses for the Outcome Period. After the S&P 500 Price Index has decreased in value by more than, e.g., 15%, the Fund will experience all subsequent losses on a one-to-one basis. In seeking to achieve the power buffer, the Fund sells both a call option and a put option. Both of these FLEX Options have a specifically selected strike price. The effect created by these two positions is that if the S&P 500 Price Index has decreased in value over the course of the Outcome Period, when the amount of cash the Fund receives and delivers pursuant to the terms of its positions is netted out, the Fund seeks to be returned the amount of its principal investment (if the S&P 500 Price Return Index decreased in value by 15% or less, in the given example) or experience a loss that is, e.g., 15% less than the loss experienced by the S&P 500 Price Index (if the S&P 500 Price Return Index decreased in value by more than 15%, in the example).

In an exemplary application of the method and system, each of the FLEX Options purchased and sold throughout the Outcome Period will have the same terms (i.e., strike price and expiration) as the corresponding FLEX Options purchased and sold on the first day of the Outcome Period. A detailed explanation regarding the terms of the FLEX Options and the mechanics of the Fund's strategy can be found in "Additional Information Regarding the Fund's Principal Investment Strategies" section below.

The Outcome Period

In an exemplary application of the method and system, the Outcomes sought by the Fund may be based upon the value of the underlying FLEX Options at the time they may be exercised at the conclusion of the Outcome Period. During the Outcome Period, the value of the FLEX Options, and Fund's net asset value ("NAV"), may be significantly different than their value at the commencement and/or conclusion of the Outcome Period. An investor that purchases Shares after the Outcome Period has commenced or sells Shares prior to the conclusion of the Outcome Period may experience Outcomes very different from those sought by the Fund for the Outcome Period. To achieve the Outcomes sought by the Fund for the Outcome Period, an investor preferably should be holding Shares on the day that the Fund enters into the FLEX Options and on the day those FLEX Options expire. During the Outcome Period, both the Cap and buffer are fixed numbers that are calculated based upon the Fund's NAV (which is in turn based upon the S&P 500 Price Index). As the Outcome Period transpires and the Fund's NAV changes, an investor purchasing Shares will likely have a different return potential than the investor who purchased Shares at the beginning of the Outcome Period. This is because while the Cap and buffer for the Outcome Period remain constant, an investor purchasing Shares during the Outcome Period likely purchased Shares at a price that is different from the Fund's NAV at the commencement of the Outcome Period.

The value of the underlying FLEX Options on any given day will be reflected in the Fund's NAV. However, due to the way that options contracts are valued, during the Outcome Period the value of the underlying FLEX Options, and thus the Fund's NAV, will not correlate one-to-one with the returns being experienced by the S&P 500 Price Index (for example, if the S&P 500 Price Index has decreased in value by 20% the Fund's NAV will not necessarily have decreased by 5%). The value of the FLEX Options depends on the amount of time remaining prior to their expiration. Accordingly, the non-correlation between the Fund's NAV and the S&P 500 Price Index may be more pronounced earlier in the Outcome Period.

Cap on Potential Upside Returns

Unlike other investment products, in an exemplary application of the method and system, the potential returns an investor can receive from an investment in the Fund are subject to an upside return cap. This means that if the S&P 500 Price Index experiences gains for the Outcome Period beyond the Cap, a shareholder will not experience those excess gains. Therefore, regardless of the performance of the S&P 500 Price Index, the Cap is the maximum return an investor can achieve from an investment in the Fund for the Outcome Period. The Cap is set on the first day of the Outcome Period and is, in an example, 8.88% prior to taking into account any fees or expenses charged to shareholders. When the Fund's annual Fund management fee of 0.79%, e.g., of the Fund's average daily net assets is taken into account, the Cap is 8.09%, e.g.. The Cap will be further reduced by any shareholder transaction fees and any extraordinary expenses incurred by the Fund.

In an exemplary application of the method and system, the Cap will change for each Outcome Period based upon prevailing market conditions at the beginning of the Outcome Period.

In an exemplary application of the method and system, the Cap level is a result of the design of the Fund's principal investment strategy. In order to provide the buffer, the Fund purchases a series of put and call FLEX Options. As the purchaser of these FLEX Options, the Fund is obligated to pay a premium to the seller of those FLEX Options. However, the strategy is designed so that any premiums that the Fund is obligated to pay are offset by premiums it receives in connection with the selling of FLEX Options. On the first day of the Outcome Period when the Fund enters into its other FLEX Options positions, the portfolio managers will calculate the amount of premiums that the Fund will owe and will then go into the market and sell a FLEX Option with terms that entitle the Fund to receive a premium in an amount equal to the amount that the Fund would otherwise owe. The Cap is the strike price of that sold FLEX Option. The strike price is determined based upon prevailing market conditions at the time the Fund enters into the FLEX Options, most notably current interest rate levels, S&P 500 Price Index volatility and dividend yield, and the relationship of put and calls on the underlying FLEX Options.

Buffer

In an exemplary application of the method and system, the power buffer that the Fund seeks to provide is only operative against the first 15% (as an example) of S&P 500 Price Index losses for the Outcome Period. After the S&P 500 Price Index has decreased in value by more than, e.g., 15%, the Fund will experience all subsequent losses on a one-to-one basis. The buffer is provided prior to taking into account annual Fund management fees equal to, e.g., 0.79% of the Fund's daily net assets, transaction fees and any extraordinary expenses incurred by the Fund. If an investor is considering purchasing Shares during the Outcome Period, and the Fund has already decreased in value by an amount equal to or greater than 15%, an investor purchasing Shares at that price will have increased gains available prior to reaching the Cap but may not benefit from the power buffer that the Fund seeks to offer for the remainder of the Outcome Period. Conversely, if an investor is considering purchasing Shares during the Outcome Period, and the Fund has already increased in value, then a shareholder may experience losses prior to gaining the protection offered by the power buffer. A shareholder that purchases Shares at the beginning of the Outcome Period may lose their entire investment. While the Fund seeks to limit losses to 85% for shareholders who hold Shares for the entire Outcome Period, there is no guarantee it will successfully do so.

Fund Rebalance

In an exemplary application of the method and system, the Fund is a continuous investment vehicle. It does not terminate and distribute its assets at the conclusion of each Outcome Period. On the termination date of an Outcome Period, the method and system comprise features wherein the Sub-Adviser will invest in a new set of FLEX Options and another Outcome Period will commence.

Purchase and Sale of Shares

In an exemplary application of the method and system, the Fund issues and redeems Shares at NAV only with authorized participants ("APs") that have entered into agreements with the Fund's distributor and only in Creation Units (large blocks of 25,000 Shares) or multiples thereof ("Creation Unit Aggregations"), in exchange for cash. Except when aggregated in Creation Units, the Shares are not redeemable securities of the Fund. For example, processor 108 may be configured to determine whether a participant is an AP via an authorization protocol. In some embodiments, the authorization protocol includes the use of a security token or comparing the participant to APs stored within, for example, database 106.

Individual Shares may be purchased and sold only on a national securities exchange through brokers. Shares are listed for trading on the Exchange and because the Shares will trade at market prices rather than NAV, Shares may trade at prices greater than NAV (at a premium), at NAV, or less than NAV (at a discount).

Tax Information

In an exemplary application of the method and system, the Fund's distributions will generally be taxable as ordinary income, returns of capital or capital gains. A sale of Shares may result in capital gain or loss.

Additional Information About Principal Investment Strategies

In an exemplary application of the method and system, the Fund's principal investment strategy seeks to produce the Outcomes based upon the performance of the S&P 500 Price Index. By layering both purchased and written call and put FLEX Options, the Fund seeks to deliver investment returns that match those of the S&P 500 Price Index for the Outcome Period if S&P 500 Price Index experiences gains, and buffered losses for the Outcome Period if the S&P 500 Price Index experiences losses. All investment gains are subject to the Cap. Both the Cap and the buffer are provided prior to taking into account annual Fund management fees equal to, e.g., 0.79% of the Fund's daily net assets, transaction fees and any extraordinary expenses incurred by the Fund. Such expenses will reduce the Cap. There is no guarantee that the Fund will be successful in its attempt to provide buffered returns.

In general, an option contract is an agreement between a buyer and seller that gives the purchaser of the option the right to buy or sell a particular asset at a specified future date at an agreed upon price (commonly known as the "strike price"). FLEX Options are exchange-traded options contracts with uniquely customizable terms. Each FLEX Option that the Fund enters into references the S&P 500 Price Index and expires on the last day of the Outcome Period. The FLEX Options, however, have varying strike prices. The layering of these FLEX Options with varying strike prices provides the mechanism for producing the Fund's desired outcome. The Fund has three main layers of FLEX Options as set forth in FIGS. 5A and 5B.

As illustrated in the example of FIGS. 5A and 5B, the combination of FLEX Options (a)+(b)+(c)+(d) provide upside participation that matches that of the S&P 500 Price Index. At the expiration date, these FLEX Options realize a value equal to that of the S&P 500 Price Index.

Taken together, in this example, positions (e) and (f) produce the 15% "power buffer," where position (f) is the top end of the buffer and position (e) is the bottom end. The payoff at expiration will compensate for losses experienced by the S&P 500 Price Index (if any), in an amount not to exceed 15%.

The strike level of the FLEX Option in position (g) produces the Cap and is chosen so that the combined net FLEX Options purchase price in (a) through (g) is approximately equal to the Fund's NAV.

The combination of positions (a) through (g) creates a maximum growth opportunity equal to the return experienced by the S&P 500 Price Index at expiration, not to exceed the Cap, while providing a 15% buffer from losses.

In an exemplary application of the method and system, the Fund's unique characteristics may include the imperative of holding Shares for the entire Outcome Period, the Cap and buffer, and such features may serve to distinguish it from other investment products.

Fund Investments

Principal Investments. In an exemplary application of the method and system, the Fund will invest in certain principal investments, as follows.

FLEX Options

FLEX Options are customized option contracts that trade on an exchange but provide investors with the ability to customize key contract terms like strike price, style and expiration date while achieving price discovery in competitive, transparent auctions markets and avoiding the counterparty exposure of over-the-counter options positions. Like traditional exchange-traded options, FLEX Options are guaranteed for settlement by the OCC, a market clearinghouse that guarantees performance by counterparties to certain derivatives contracts.

In an exemplary application of the method and system, the FLEX Options in which the Fund will invest are all European style options (options that are exercisable only on the expiration date). The FLEX Options are listed on the Chicago Board Options Exchange.

In an exemplary application of the method and system, the Fund will purchase and sell call and put FLEX Options. In general, put options give the holder (i.e., the buyer) the right to sell an asset (or deliver the cash value of the index, in case of an index put option) and the seller (i.e., the writer) of the put has the obligation to buy the asset (or receive cash value of the index, in case of an index put option) at a certain defined price. Call options give the holder (i.e., the buyer) the right to buy an asset (or receive cash value of the index, in case of an index call option) and the seller (i.e., the writer) the obligation to sell the asset (or deliver cash value of the index, in case of an index call option) at a certain defined price.

Non-Principal Investments

In an exemplary application of the method and system, the Fund will invest in certain non-principal investments, as follows.

Cash Equivalents and Short-Term Investments

The Fund may invest in securities with maturities of less than one year or cash equivalents, or it may hold cash. The percentage of the Fund invested in such holdings varies and depends on several factors, including market conditions.

Traditional Options Contracts

Options contracts on an index give one party the right to receive or deliver cash value of the particular index, and another party the obligation to receive or deliver the cash value of that index. Option contracts on an individual security such as an ETF give one party the right to buy or sell the particular security, and another party the obligation to sell or buy that same security. Many options are exchange-traded and are available to investors with set or defined contract terms.

Principal Risks

Each of these investment-related risks identified below are not exhaustive or exclusive, and are provided in connection with the invention to illustrate factors which may be successfully integrated into the overall process and methodology of managing Defined Outcome ETFs™, and may be represented in the data and components of embodiments of the invention.

Active Markets Risk

Although the Shares are listed for trading on the Exchange, there can be no assurance that an active trading market for the Shares will develop or be maintained. Shares trade on the Exchange at market prices that may be below, at or above the Fund's NAV. Securities, including the Shares, are subject to market fluctuations and liquidity constraints that may be caused by such factors as economic, political, or regulatory developments, changes in interest rates, and/or perceived trends in securities prices.

Authorized Participation Concentration Risk

Only an authorized participant may engage in creation or redemption transactions directly with the Fund. The Fund has a limited number of institutions that may act as authorized participants on an agency basis (i.e., on behalf of other market participants). To the extent that authorized participants exit the business or are unable to proceed with creation and/or redemption orders with respect to the Fund and no other authorized participant is able to step forward to create or redeem Creation Units, Shares may be more likely to trade at a premium or discount to NAV and possibly face trading halts and/or delisting.

Buffered Loss Risk

There can be no guarantee that the Fund will be successful in its strategy to buffer against S&P 500 Price Index losses if the S&P 500 Price Index decreases over the Outcome Period by 15% or less, in an example. The Fund's strategy seeks to deliver returns that match the S&P 500 Price Index (up to the Cap), while limiting downside losses, if Shares are bought on the day on which the Fund enters into the FLEX Options and held until those FLEX Options expire at the end of the Outcome Period. In the event an investor purchases Shares after the date on which the FLEX Options were entered into or sells Shares prior to the expiration of the FLEX Options, the buffer that the Fund seeks to provide may not be available.

Cap Change Risk

A new Cap is established at the beginning of each Outcome Period and is dependent on prevailing market conditions. As such, the Cap may rise or fall from one Outcome Period to the next and is unlikely to remain the same for consecutive Outcome Periods.

Capped Upside Return Risk

In an exemplary application of the method and system, the Fund's strategy seeks to provide returns that are subject to the Cap. In the event that the S&P 500 Price Index has gains in excess of the Cap for the Outcome Period, the Fund will not participate in those gains beyond the Cap. The Fund's strategy seeks to deliver returns that match those of the S&P 500 Price Index if Shares are bought on the day on which the Fund enters into the FLEX Options and held until those FLEX Options expire at the end of the Outcome Period. In the event an investor purchases Shares after the date on which the FLEX Options were entered into and the Fund has risen in value to a level near to the Cap, there may be little or no ability for that investor to experience an investment gain on their Shares.

Cash Transactions Risk

In an exemplary application of the method and system, the Fund intends to effectuate creations and redemptions for cash, rather than in-kind securities. As a result, an investment in the Fund may be less tax-efficient than an investment in an ETF that effects its creations and redemption for in-kind securities. Because the Fund will effect redemptions for cash, it may be required to sell portfolio securities in order to obtain the cash needed to distribute redemption proceeds. A sale of Shares may result in capital gains or losses and may also result in higher brokerage costs. Consequently, an investment in the Fund may be less tax-efficient than investments in other ETFs. Moreover, cash transactions may have to be carried out over several days if the securities market is relatively illiquid and may involve considerable brokerage fees and taxes. These brokerage fees and taxes, which will be higher than if the Fund sold and redeemed its shares principally in-kind, will be passed on to purchasers and redeemers of Shares in the form of creation and redemption transaction fees. In addition, these factors may result in wider spreads between the bid and the offered prices of Shares than for other ETFs.

Correlation Risk

In an exemplary application of the method and system, the FLEX Options held by the Fund will be exercisable at the strike price only on their expiration date. Prior to the expiration date, the value of the FLEX Options will be determined based upon market quotations or using other recognized pricing methods. The value of the FLEX Options prior to the expiration date may vary because of related factors other than the value of the S&P 500 Price Index. Factors that may influence the value of the FLEX Options include interest rate changes and implied volatility levels of the S&P 500 Price Index, among others.

Counterparty Risk

Counterparty risk is the risk an issuer, guarantor or counterparty of a security in the Fund is unable or unwilling to meet its obligation on the security. The OCC acts as guarantor and central counterparty with respect to the FLEX Options. As a result, the ability of the Fund to meet its objective depends on the OCC being able to meet its obligations. In the unlikely event that the OCC becomes insolvent or is otherwise unable to meet its settlement obligations, the Fund could suffer significant losses.

FLEX Options Risk

In an exemplary application of the method and system, the Fund will utilize FLEX Options issued and guaranteed for settlement by the OCC. The Fund bears the risk that the OCC will be unable or unwilling to perform its obligations under the FLEX Options contracts. In the unlikely event that the OCC becomes insolvent or is otherwise unable to meet its settlement obligations, the Fund could suffer significant losses. Additionally, FLEX Options may be less liquid than certain other securities such as standardized options. In less liquid market for the FLEX Options, the Fund may have difficulty closing out certain FLEX Options positions at desired times and prices. The values of FLEX Options do not increase or decrease at the same rate as the reference asset and may vary due to factors other than the price of reference asset.

Fluctuation of Net Asset Value Risk

In an exemplary application of the method and system, the Fund's Shares trade on the Exchange at their market price rather than their NAV. The market price may be at, above or below the Fund's NAV. Differences in market price and NAV may be due, in large part, to the fact that supply and demand forces at work in the secondary trading market for Shares will be closely related to, but not identical to, the same forces influencing the prices of the holdings of the Fund trading individually or in the aggregate at any point in time. These differences can be especially pronounced during times of market volatility or stress. During these periods, the demand for Shares may decrease considerably and cause the market price of Shares to deviate significantly from the Fund's NAV.

Investment Objective Risk

Certain circumstances under which the Fund might not achieve its objective include, but are not limited, to (i) if the Fund disposes of FLEX Options, (ii) if the Fund is unable to maintain the proportional relationship based on the number of FLEX Options in the Fund's portfolio, (iii) significant accrual of Fund expenses in connection with effecting the Fund's principal investment strategy or (iv) adverse tax law changes affecting the treatment of FLEX Options.

Limitations of Intraday Indicative Value Risk

In an exemplary application of the method and system, the Exchange intends to disseminate the approximate per share value of the Fund's published basket of portfolio securities every 15 seconds (the "intraday indicative value" or "IIV"). The IIV should not be viewed as a "real-time" update of the NAV per Share because (i) the IIV may not be calculated in the same manner as the NAV, which is computed once a day, generally at the end of the business day, (ii) the calculation of NAV may be subject to fair valuation at different prices than those used in the calculations of the IIV, (iii) unlike the calculation of NAV, the IIV does not take into account Fund expenses, and (iv) the IIV is based on the published basket of portfolio securities and not on the Fund's actual holdings. The IIV calculations are based on local market prices and may not reflect events that occur subsequent to the local market's close, which could affect premiums and discounts between the IIV and the market price of the Shares. The Fund, Adviser, Sub-Adviser, and their affiliates, are not involved in, or responsible for, any aspect of the calculation or dissemination of the Fund's IIV, and the Fund, Adviser, Sub-Adviser, and their affiliates, do not make any warranty as to the accuracy of these calculations.

Figure 7A:
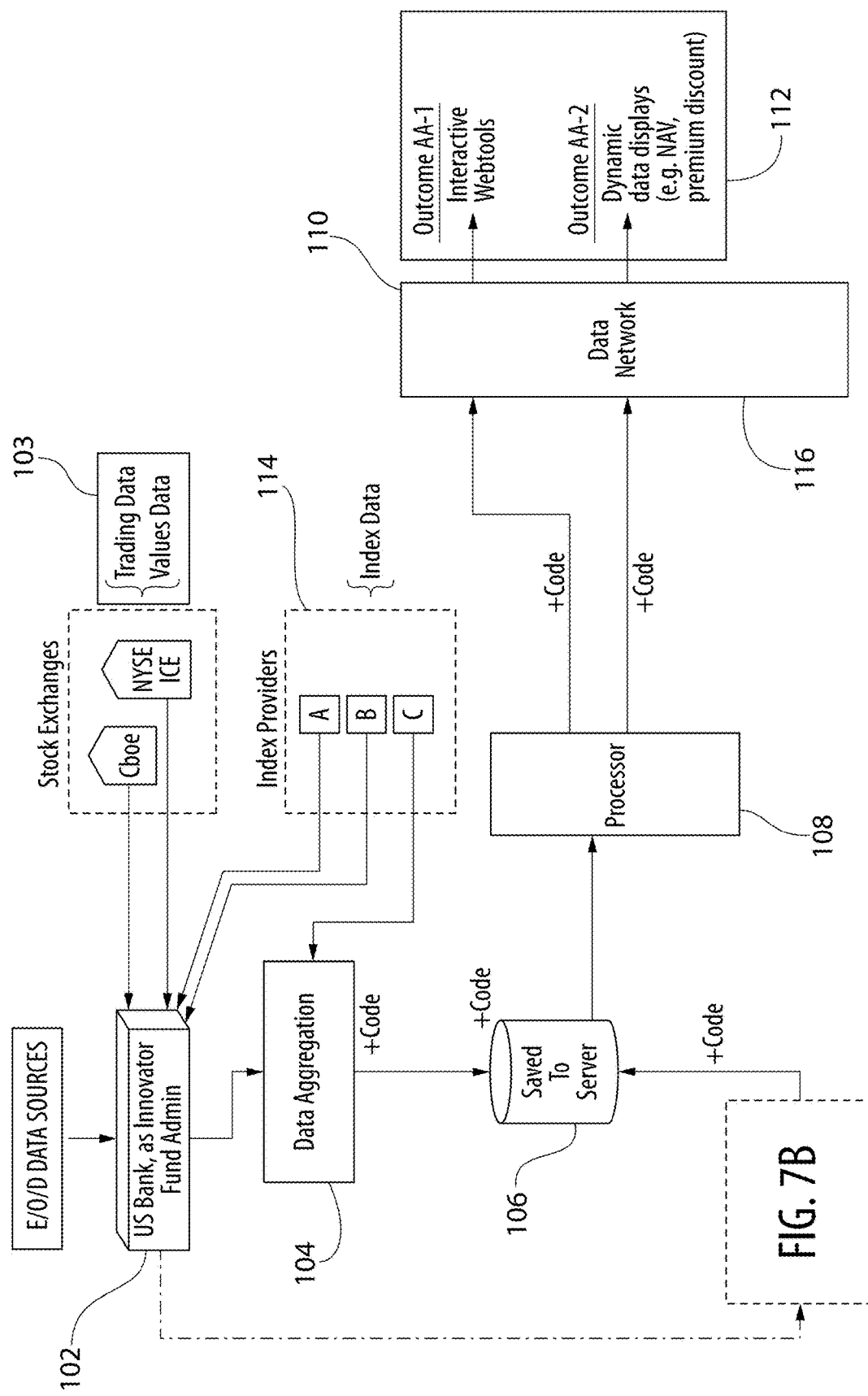
FIGS. 7A and 7B are exemplary flowcharts of managing data associated with the exemplary fund.
Figure 7B:
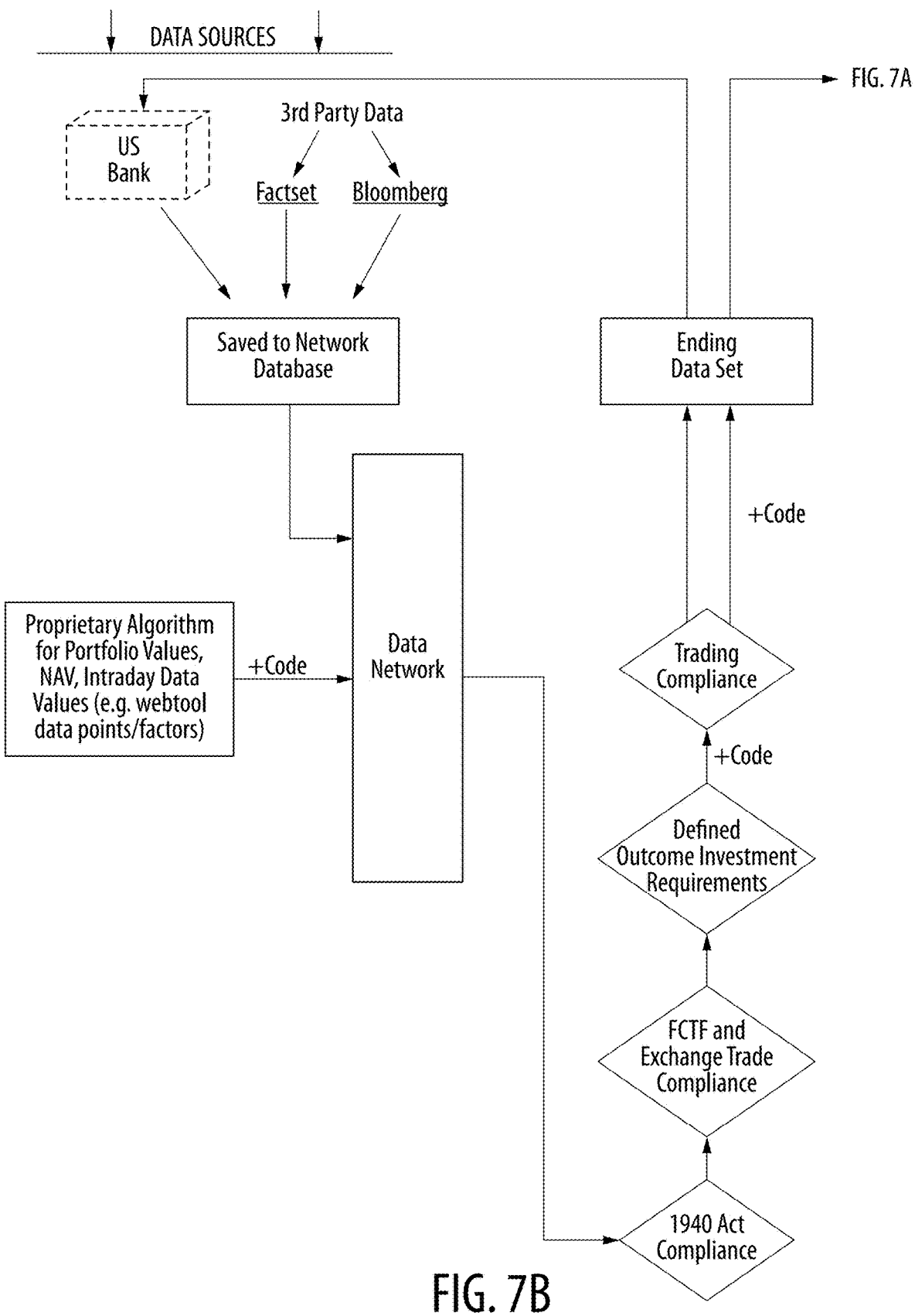

Referring to FIGS. 7A and 7B, an exemplary diagram in which one embodiment of a system and method of obtaining intraday inputs is shown. In some embodiments, processor 108 is configured to request current data files (e.g., containing or reflecting values 103) in response to a user prompt. The user prompt may be a recognition by processor 108 that a user has accessed tool 112 which may be a real-time interactive web-based tool, a web-based Outcome Tool, or an interactive product table, such as the product table shown in FIG. 10. In some embodiments, tool 112 updates during predetermined time periods (e.g. from the hours of 8:45 AM-3:30 PM CT). Values 103 may include one or more of: current bid price for the Fund, current ask price for the Fund, trade date market details for the Fund, and respective index levels (e.g., S&P 500, Russell 2000, MSCI EM levels) from, for example, Index Providers 114. One or more processors 108 are preferably configured to request the most current information for data values 103 from data sources 102. Processor 108 may be configured to communicate with tool 112 via data network 116. The most current information for data values 103 may be stored in database 106 and any previously captured market data values 103 from earlier in the day may be purged and/or stored in a separately retrievable database. The data from data sources 102 may be 15-20 minutes delayed market data.

In some embodiments, tool 112 is a graphical user interface (GUI). Such a GUI may include an indication of various values relating to the Fund. Tool 112 may be rendered on a user interface of an electronic device and may be animated. For example, tool 112 may be a pricing tool used to display pricing information associated with the Fund. Tool 112 may be dynamic and interactive to allow a user to alter and manipulate the values displayed on tool 112. Tool 112 may be a pricing tool, an outcome tool, an outcome analyzer, or other interactive GUI for displaying information to a user. In some embodiments, tool 112 displays outcome values associated with the Fund via a pop-up screen on the display of the user interface, as reflected in FIG. 8. The pop-up screen may be interactive and may show pricing information related to the Fund throughout a predetermined period of time.

In some embodiments, tool 112 may dynamically provide information related to the Fund including, for example: Fund Return, Index Return, Return Difference, Index Return to Cap, Remaining Cap, Remaining Buffer, Downside Before Buffer, Remaining Outcome Period, and more. In some embodiments, tool 112 may updated/refreshed or change based on the location of a user's cursor and/or indicator on the user interface. The user interface may be communicatively coupled to data network 116 and/or processor 108. In some embodiments, the user interface displays website 110, which may house tool 112 and may be accessed via data network 116. In some embodiments, as fund data is updated dynamically through data network 116 tool 112 is configured to display to a user updated buffer values (e.g., a value of potential exposure to a user that reflects a different potential loss to the user at a particular time than that which the user might if the user were to have purchased securities reflecting the index). In some embodiments, as fund data is updated dynamically through data network 116 tool 112 is configured to display to a user updated cap values (e.g., a value of potential gain to a user that reflects a different potential gain to the user at a particular time than that which the user might experience if the user were to have purchased securities reflecting the index).

Liquidity Risk

In the event that trading in the underlying FLEX Options is limited or absent, the value of the Fund's FLEX Options may decrease. There is no guarantee that a liquid secondary trading market will exist for the FLEX Options. The trading in FLEX Options may be less deep and liquid than the market for certain other securities. FLEX Options may be less liquid than certain non-customized options. In a less liquid market for the FLEX Options, terminating the FLEX Options may require the payment of a premium or acceptance of a discounted price and may take longer to complete. In a less liquid market for the FLEX Options, the liquidation of a large number of options may more significantly impact the price.

Management Risk

The Fund is subject to management risk because it is an actively managed portfolio. In an exemplary application of the method and system, the Sub-Adviser will apply investment techniques and risk analyses in making investment decisions for the Fund, but there can be no guarantee that the Fund will meet its investment objective.

Market Maker Risk

If the Fund has lower average daily trading volumes, it may rely on a small number of third-party market makers to provide a market for the purchase and sale of Shares. Any trading halt or other problem relating to the trading activity of these market makers could result in a dramatic change in the spread between the Fund's NAV and the price at which the Shares are trading on the Exchange, which could result in a decrease in value of the Shares. In addition, decisions by market makers or authorized participants to reduce their role or step away from these activities in times of market stress could inhibit the effectiveness of the arbitrage process in maintaining the relationship between the underlying values of the Fund's portfolio securities and the Fund's market price. This reduced effectiveness could result in Shares trading at a discount to NAV and also in greater than normal intra-day bid-ask spreads for Shares.

Market Risk

The Fund could lose money over short periods due to short-term market movements and over longer periods during more prolonged market downturns. Assets may decline in value due to factors affecting financial markets generally or particular asset classes or industries represented in the markets. The value of a FLEX Options or other asset may also decline due to general market conditions, economic trends or events that are not specifically related to the issuer of the security or other asset, or due to factors that affect a particular issuer or issuers, country, group of countries, region, market, industry, group of industries, sector or asset class. During a general market downturn, multiple asset classes may be negatively affected. Changes in market conditions and interest rates will not have the same impact on all types of securities.

Non-Diversification Risk

In an exemplary application of the method and system, the Fund is of the type classified as "non-diversified" under the 1940 Act. As a result, the Fund is only limited as to the percentage of its assets which may be invested in the securities of any one issuer by the diversification requirements imposed by the Internal Revenue Code of 1986, as amended (the "Code"). The Fund may invest a relatively high percentage of its assets in a limited number of issuers. As a result, the Fund may be more susceptible to a single adverse economic or regulatory occurrence affecting one or more of these issuers, experience increased volatility and be highly invested in certain issuers.

Operational Risk

The Fund is exposed to operational risks arising from a number of factors, including, but not limited to, human error in the calculation of the Cap, processing and communication errors, errors of the Fund's service providers, counterparties or other third-parties, failed or inadequate processes and technology or systems failures. The Fund and its investment adviser and Sub-adviser seek to reduce these operational risks through controls and procedures. However, these measures do not address every possible risk and may be inadequate to address these risks.

Options Risk

In an exemplary application of the method and system, the value of the underlying FLEX Options will be affected by, among others, changes in the value of the S&P 500 Price Index, changes in interest rates, changes in the actual and implied volatility, as well as in dividend yields, of the S&P 500 Price Index and the remaining time to until the FLEX Options expire. The value of the FLEX Options does not increase or decrease at the same rate as the level of the S&P 500 Price Index (although they generally move in the same direction). However, as a FLEX Option approaches its expiration date, its value typically increasingly moves with the value of the S&P 500 Price Index. The Fund may experience substantial downside from specific FLEX Option positions and certain FLEX Option positions may expire worthless.

Outcome Period Risk

In an exemplary application of the method and system, the Fund's investment strategy is designed to deliver returns that match the S&P 500 Price Index if Shares are bought on the day on which the Fund enters into the FLEX Options and held until those FLEX Options expire at the end of the Outcome Period. In the event an investor purchases Shares after the date on which the FLEX Options were entered into or sells Shares prior to the expiration of the FLEX Options, the returns realized by the investor will not match those that the Fund seeks to achieve.

Tax Risk

In an exemplary application of the method and system, the Fund is intended to elect and to qualify each year to be treated as a RIC under Subchapter M of the Code. As a RIC, the Fund will not be subject to U.S. federal income tax on the portion of its net investment income and net capital gain that it distributes to shareholders, provided that it satisfies certain requirements of the Code, including a requirement that the "issuers" of the Fund's assets be sufficiently diversified. There is no published IRS guidance or case law on how to determine the "issuer" of certain derivatives that the Fund will enter into. Therefore, there is a risk that the Fund will not meet the Code's diversification requirements and will not qualify, or will be disqualified, as a RIC. The Fund intends to treat FLEX Options referencing an index as "issued" by the issuer of the securities underlying the index. This, in turn, would allow the Fund to count the FLEX Options as automatically diversified investments under the Code's diversification requirements. This position is consistent with informal guidance from the IRS but has not been confirmed by published guidance or case law. If the FLEX Options are not treated as issued by the issuer of the securities underlying the index for diversification test purposes, there is a risk that the Fund could lose its RIC status.

The Fund's investments in offsetting positions with respect to the S&P 500 Price Index may affect the character of gains or losses realized by the Fund under the Code's "straddle" rules and may increase the amount of short-term capital gain realized by the Fund. Such short-term capital gain is taxed as ordinary income when distributed to U.S. shareholders in a non-liquidating distribution. As a result, if the Fund makes a non-liquidating distribution of its short-term capital gain, the amount which may be distributed to U.S. shareholders as ordinary income may be increased substantially as compared to a Fund that did not engage in such transactions. Accordingly, Shareholders could have a lower after-tax return from investing in the Fund than investing directly in the S&P 500 Price Index.

If the Fund did not qualify as a RIC for any taxable year and certain relief provisions were not available, the Fund's taxable income would be subject to tax at the Fund level and to a further tax at the shareholder level when such income is distributed. In such event, in order to re-qualify for taxation as a RIC, the Fund might be required to recognize unrealized gains, pay substantial taxes and interest and make certain distributions. This would cause investors to incur higher tax liabilities than they otherwise would have incurred and would have a negative impact on Fund returns. In such event, the Fund may reorganize, close or materially change its investment objective and strategies.

In an exemplary application of the method and system, the FLEX Options included in the Fund's portfolio are exchange-traded options. Under Section 1256 of the Code, certain types of exchange-traded options are treated as if they were sold (i.e., "marked to market") at the end of each year. Gain or loss is recognized on this deemed sale. Such treatment could cause the Fund to recognize taxable income without receiving cash. In order to maintain its RIC qualification, the Fund may distribute at least 90% of its income annually. If the FLEX Options are subject to Section 1256 of the Code, and the Fund is unable to distribute marked-to-market gains to its shareholders, the Fund may lose its RIC qualification and be taxed as a regular corporation.

Trading Issues Risk

Although the Shares are listed for trading on the Exchange, there can be no assurance that an active trading market for such Shares will develop or be maintained. Trading in Shares on the Exchange may be halted due to market conditions or for reasons that, in the view of the Exchange, make trading in Shares inadvisable. In addition, trading in Shares on the Exchange is subject to trading halts caused by extraordinary market volatility pursuant to the Exchange "circuit breaker" rules. Market makers are under no obligation to make a market in the Shares, and authorized participants are not obligated to submit purchase or redemption orders for Creation Units. There can be no assurance that the requirements of the Exchange necessary to maintain the listing of the Fund will continue to be met or will remain unchanged. Initially, due to the small asset size of the Fund, it may have difficulty maintaining its listings on the Exchange.

Upside Participation Risk

There can be no guarantee that the Fund will be successful in its strategy to provide shareholders with a total return that matches the increase of the S&P 500 Price Index over the Outcome Period, up to the maximum return imposed by the Cap. In the event an investor purchases Shares after the date on which the FLEX Options were entered into or does not stay invested in the Fund for the entirety of the Outcome Period, the returns realized by the investor may not match those that the Fund seeks to achieve.

Valuation Risk

During periods of reduced market liquidity or in the absence of readily available market quotations for the holdings of the Fund, the ability of the Fund to value the FLEX Options becomes more difficult and the judgment of the Fund's investment adviser (employing the fair value procedures adopted by the Board of Trustees of the Trust) may play a greater role in the valuation of the Fund's holdings due to reduced availability of reliable objective pricing data. Consequently, while such determinations may be made in good faith, it may nevertheless be more difficult for the Fund to accurately assign a daily value.

Management of the Fund

In an exemplary application of the method and system, the Fund and its advisor have received an exemptive order from the SEC to operate under a manager of managers structure that permits the Adviser, with the approval of the Board, to appoint and replace sub-advisers, enter into sub-advisory agreements, and materially amend and terminate sub-advisory agreements on behalf of the Fund without shareholder approval ("Manager of Managers Structure"). Under the Manager of Managers Structure, the Adviser has ultimate responsibility, subject to oversight by the Board, for overseeing the Fund's sub-advisers and recommending to the Board their hiring, termination, or replacement. The SEC order does not apply to any sub-adviser that is affiliated with the Fund or the Adviser.

In an exemplary application of the method and system, the Manager of Managers Structure may enable the Fund to operate with greater efficiency and without incurring the expense and delays associated with obtaining shareholder approvals for matters relating to the sub-advisor. The Manager of Managers Structure does not permit an increase in the advisory fees payable by the Fund without shareholder approval.

In an exemplary application of the method and system, the Fund will issue or redeems its Shares at NAV per Share only in Creation Units. Most investors will buy and sell Shares in secondary market transactions through brokers. Shares will be listed for trading on the secondary market on the Exchange. Shares can be bought and sold throughout the trading day like other publicly traded shares. Share prices are reported in dollars and cents per Share. There is no minimum investment. When buying or selling Shares through a broker, an investor will incur customary brokerage commissions and charges, and an investor may pay some or all of the spread between the bid and the offered price in the secondary market on each leg of a round trip (purchase and sale) transaction. Because Shares trade at market price rather than NAV, an investor may pay more than NAV when purchasing Shares and receive less than NAV when selling Shares.

APs may acquire Shares directly from the Fund, and APs may tender their Shares for redemption directly to the Fund, at NAV per Share only in Creation Units or Creation Unit Aggregations, and in accordance with the procedures described in the SAI.

Book Entry

In an exemplary application of the method and system, Shares are held in book-entry form, which means that no stock certificates are issued. The Depository Trust Company ("DTC") or its nominee is the record owner of all outstanding Shares and is recognized as the owner of all Shares for all purposes. In some embodiments, a digital book may be maintained within in database 106. Processor 108 may be configured to write to a book stored within database 106. In some embodiments, special authorization is required and granted by processor 108 to store and/or access the digital book within database 106.

Investors owning Shares are beneficial owners as shown on the records of DTC or its participants. DTC serves as the securities depository for all Shares. Participants in DTC include securities brokers and dealers, banks, trust companies, clearing corporations and other institutions that directly or indirectly maintain a custodial relationship with DTC. As a beneficial owner of Shares, investors are not entitled to receive physical delivery of stock certificates or to have Shares registered in the investor's name, and the investor is not considered a registered owner of Shares. Therefore, to exercise any right as an owner of Shares, the investor may rely upon the procedures of DTC and its participants. These procedures are the same as those that apply to any other stocks that an investor may hold in book entry or "street name" form.

Share Trading Prices

In an exemplary application of the method and system, the trading prices of Shares on the Exchange may differ from the Fund's daily NAV. Market forces of supply and demand, economic conditions and other factors may affect the trading prices of Shares.

The approximate value of Shares, an amount representing on a per Share basis the sum of the current market price of the securities held by the Fund, will be disseminated every 15 seconds throughout the trading day through the facilities of the Consolidated Tape Association. This approximate value should not be viewed as a "real-time" update of the NAV per Share of the Fund because the approximate value may not be calculated in the same manner as the NAV, which is computed once a day, generally at the end of the business day.

Frequent Purchases and Redemption of Shares

In an exemplary application of the method and system, Shares may be purchased and redeemed directly from the Fund only in Creation Units by APs that have entered into agreements with the Fund's distributor. The vast majority of trading in Shares occurs on the secondary market and does not involve the Fund directly. Cash trades on the secondary market are unlikely to cause many of the harmful effects of frequent purchases and/or redemptions of Shares. Cash purchases and/or redemptions of Creation Units, however, can result in disruption of portfolio management, dilution to the Fund and increased transaction costs, which could negatively impact the Fund's ability to achieve its investment objectives, and may lead to the realization of capital gains. These consequences may increase as the frequency of cash purchases and redemptions of Creation Units by APs increases. However, direct trading by APs is critical to ensuring that Shares trade at or close to NAV.

To minimize these potential consequences of frequent purchases and redemptions of Shares, the Fund imposes transaction fees on purchases and redemptions of Creation Units to cover the custodial and other costs the Fund incurs in effecting trades. In addition, the Fund reserves the right to not accept orders from APs that the fund operator has determined may be disruptive to the management of the Fund or otherwise are not in the best interests of the Fund. For these reasons, the Board has not adopted policies and procedures with respect to frequent purchases and redemptions of Shares.

Dividends, Distributions And Taxes

In an exemplary application of the method and system, dividends from net investment income, if any, are ordinarily declared and paid at least annually by the Fund. The Fund distributes its net realized capital gains, if any, to shareholders annually.

Distributions in cash may be reinvested automatically in additional whole Shares only if the broker through whom an investor purchased Shares makes such option available.

Net Asset Value

In an exemplary application of the method and system, the Fund's NAV is determined as of the close of trading (normally 4:00 p.m., Eastern time) on each day the New York Stock Exchange is open for business. NAV is calculated for the Fund by taking the market price of the Fund's total assets, including interest or dividends accrued but not yet collected, less all liabilities, and dividing such amount by the total number of Shares outstanding. The result, rounded to the nearest cent, is the NAV per Share. All valuations are subject to review by the Board or its delegate.

The Fund's investments are valued daily in accordance with valuation procedures adopted by the Board, and in accordance with provisions of the 1940 Act. Although it has no current intention of investing in such securities, certain securities in which the Fund may invest are not listed on any securities exchange or board of trade. Such securities are typically bought and sold by institutional investors in individually negotiated private transactions that function in many respects like an over the counter secondary market, although typically no formal market makers exist. Certain securities, particularly debt securities, have few or no trades, or trade infrequently, and information regarding a specific security may not be widely available or may be incomplete. Accordingly, determinations of the fair value of debt securities may be based on infrequent and dated information. Because there is less reliable, objective data available, elements of judgment may play a greater role in valuation of debt securities than for other types of securities. Typically, debt securities are valued using information provided by a third-party pricing service. The third-party pricing service primarily uses broker quotes to value the securities.

The Fund's investments will be valued daily at market value or, in the absence of market value with respect to any investment, at fair value in accordance with valuation procedures adopted by the Board and in accordance with the 1940 Act. Market value prices represent last sale or official closing prices from a national or foreign exchange (i.e., a regulated market) and are primarily obtained from third-party pricing services.

Although it has no current intention of investing in such securities, certain securities in which the Fund may invest may not be able to be priced by pre-established pricing methods. Such securities may be valued by the Board or its delegate at fair value. The use of fair value pricing by the Fund is governed by valuation procedures adopted by the Board and in accordance with the provisions of the 1940 Act. These securities generally include, but are not limited to, certain restricted securities (securities which may not be publicly sold without registration under the Securities Act of 1933, as amended (the "Securities Act")) for which a pricing service is unable to provide a market price; securities whose trading has been formally suspended; a security whose market price is not available from a pre-established pricing source; a security with respect to which an event has occurred that is likely to materially affect the value of the security after the market has closed but before the calculation of the Fund's NAV or make it difficult or impossible to obtain a reliable market quotation; and a security whose price, as provided by the pricing service, does not reflect the security's "fair value." As a general principle, the current "fair value" of a security would appear to be the amount which the owner might reasonably expect to receive for the security upon its current sale. The use of fair value prices by the Fund generally results in the prices used by the Fund that may differ from current market quotations or official closing prices on the applicable exchange. A variety of factors may be considered in determining the fair value of such securities. Valuing the Fund's securities using fair value pricing will result in using prices for those securities that may differ from current market valuations.

Even when market quotations are available for portfolio securities, they may be stale or unreliable because the security is not traded frequently, trading on the security ceased before the close of the trading market or issuer-specific events occurred after the security ceased trading or because of the passage of time between the close of the market on which the security trades and the close of the Exchange and when the Fund calculates its NAV. Events that may cause the last market quotation to be unreliable include a merger or insolvency, events which affect a geographical area or an industry segment, such as political events or natural disasters, or market events, such as a significant movement in the U.S. market. Where market quotations are not readily available, including where the fund operator determines that the closing price of the security is unreliable, the fund operator will value the security at fair value in good faith using procedures approved by the Board. Fair value pricing involves subjective judgments and it is possible that a fair value determination for a security is materially different than the value that could be realized upon the sale of the security.

Premium/Discount Information

The market prices of the Shares generally will fluctuate in accordance with changes in NAV, as well as the relative supply of and demand for Shares on the Exchange. The operators of the Fund cannot predict whether the Shares will trade below, at or above their NAV. The approximate value of the Shares, which is an amount representing on a per Share basis the sum of the current market price of the securities held by the Fund, will be disseminated every 15 seconds throughout the trading day through the facilities of the Consolidated Tape Association. This approximate value should not be viewed as a "real-time" update of the NAV per Share of the Fund because the approximate value may not be calculated in the same manner as the NAV, which is computed once a day, generally at the end of the business day. Similar to the NAV for each ETF, premium/discount data is generated and displayed on the Applicant's web site pursuant to the embodiments of the invention described herein.

Investments by Other Investment Companies

Section 12(d)(1) of the 1940 Act restricts investments by investment companies in the securities of other investment companies, including Shares. Registered investment companies are permitted to invest in the Fund beyond the limits set forth in Section 12(d)(1) subject to certain terms and conditions set forth in an SEC exemptive order issued to the Trust, including that such investment companies enter into an agreement with the Trust on behalf of the Fund prior to exceeding the limits imposed by Section 12(d)(1).

Financial Highlights

The financial highlights table shown in FIG. 6 presents an example of financial performance of a Fund operating in an exemplary application of the method and system. The total returns in the table of FIG. 6 represent how much an investor would have earned (or lost) on an investment in the Fund (assuming reinvestment of all dividends and distributions). Certain information reflects financial results for a single Fund Share.

Inclusive of Options on Alternative Indexes. In one embodiment, the model and methodology of the invention utilizes the exclusive features of the preferred embodiment, and also provides for using FLEX Option on various underlying indexes other than the S&P 500, such as the MSCI EAFE, Nasdaq 100, or Russell 2000. While this application and the references within identify the FLEX Options based on the S&P 500 Index as the core feature to the preferred embodiment of the invention, it is understood that the use of similar FLEX Options based on other indexes in connection with the model and methodology is a key aspect of the invention Inclusive of Varying Levels of Investment "Buffer" or "Floor" Protection. In one embodiment, the model and methodology of the invention utilizes the exclusive features of the preferred embodiment, and also provides for Funds with varying levels of "buffer" protection beyond the current aspects of the innovation of (i) −9%, (ii) −15% and (iii) −5% to −35% as a key aspect of the invention, or a model which provides a "floor" protection—that is, protection from downside investment performance after an initial amount which would be absorbed by the investor (e.g., the ETF would protect against losses after the first 5%)

Inclusive of Target Durations Longer or Shorter than Twelve Months. In one embodiment, the model and methodology of the invention utilizes the exclusive features of the preferred embodiment, yet unlike the preferred embodiment a Fund may have a stated Outcome Period of greater than or less than twelve months as a key aspect of the invention.

Inclusive of Uncapped Return Profiles for the Model. In one embodiment, the model and methodology of the invention utilizes the exclusive features of the preferred embodiment, yet also offer an investor a Fund with no capped upside participation in market growth as a key aspect of the invention.

Inclusive of Dividend and Income Return Profiles for the Model. In one embodiment, the model and methodology of the invention utilizes the exclusive features of the preferred embodiment, yet also offers a Fund which incorporates the opportunity for investor participation in dividend and income generated from investment in the Fund as a key aspect of the invention.

Inclusive of "Asymmetrical" Return Profiles for the Model. In one embodiment, the model and methodology of the invention utilizes the exclusive features of the preferred embodiment, yet through a Fund provide "asymmetrical" or "enhanced" returns (e.g., measure of potential upside performance participation relative to potential downside performance is not matched 1:1, with or without a cap or buffer) as a key aspect of the invention. An exemplary embodiment of such a return profile of the invention could include a Fund with an investment strategy that could provide a positive return whether the underlying reference benchmark index produces a positive or negative return over that similar outcome period.

For each of these embodiments of the model and methodologies of the invention described above, key features may not be otherwise available to investors of ETFs seeking to receive defined outcomes in an ETF vehicle. ETF investors may therefore take advantage not just of the unique outcomes of the invention, but also to provide options around that investment solution in these alternative embodiments.

A preferred embodiment of the invention is a computer based method or process for creating, administering, and trading an ETF having a defined outcome feature, in accord with the description above. The method may preferably comprise storing computer executable instructions in a memory element of a computer; and, executing, using a processor for the computer, the computer readable instructions to create, administer, and trade an ETF having a defined outcome feature, in accord with the description above.

Another preferred embodiment of the invention is a computer system for creating, administering, and trading an ETF having a defined outcome feature, in accord with the description above.

Another preferred embodiment of the invention is a non-transitory computer readable medium having stored thereon instruction, which if executed by a processor, cause the processor to create and administer an ETF having a defined outcome feature, in accord with the description above.

Another preferred embodiment of the invention is a computer-implemented apparatus that is employed in creating, administering, and trading an ETF having a defined outcome feature, in accord with the description above.

Another preferred embodiment of the invention is a computerized apparatus that is employed in quantifying metrics for creating, administering, and trading an ETF having a defined outcome feature, in accord with the description above.

Many aspects of this disclosure are described in terms of sequences of actions or steps to be performed in a method or process, or by elements of a system. Elements of a system may include modules, a controller, a processor, a memory, and/or a computer system or other hardware capable of executing programmed instructions. Those of skill in the art will recognize that these elements can be embodied in a controller of a system, either as a controller as a unit or module of a system, or as a unit separate from, and communicating with, the system. It will be recognized that in each of the embodiments, the various actions for implementing the strategy disclosed herein could be performed by specialized circuits (e.g., discrete logic gates interconnected to perform a specialized function), by application-specific integrated circuits (ASICs), by program instructions (e.g. program modules) executed by one or more processors (e.g., a central processing unit (CPU) or microprocessor or a number of the same), or by a combination of circuits, instructions, and processors, any or all of which can be implemented in a hardware and/or software of the ECU and/or other controller or plural controllers.

Logic of embodiments consistent with the disclosure can be implemented with any type of appropriate hardware and/or software, with portions residing in the form of computer readable storage medium with a control algorithm recorded thereon such as the executable logic and instructions disclosed herein. The hardware or software may be in single components or distributed among discrete components operatively connected for communication. The hardware or software can be programmed to include one or more singular or multidimensional lookup tables and/or calibration parameters. The computer readable medium can comprise a random access memory (RAM), a read-only memory (ROM), an erasable programmable read-only memory (EPROM or Flash memory), an optical fiber, a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

In some embodiment, to provide investors and potential investors with the necessary real-time data to assist in investment decisions regarding the embodiment the Fund, the present invention provides a technology-driven process for retrieving source data, recalculate and disseminate the data, and design interface functionality of the reformatted data for third party use such as public use by persons not associated the provider of the Fund, including investors, investment advisers, and/or marketplace participants.

In some embodiments, tool 112 may include a web-based interactive tool, sometimes identified as the web-based "Pricing Tool". In the embodiment reflected in FIGS. 7A and 7B, the initial data source feed for tool 112 is the national stock exchange on which a particular Fund is continuously trading, such as the New York Stock Exchange or the Cboe BATS. That fund and market data from an exchange is then delivered in at least one of two ways. First, the exchange source data is first sent, via processor 108, to a custodian/fund administrator, e.g., US Bank Financial Services LLC, which then bundles and sends a full data file to data aggregation system 104 following the end of a trading day. Second, the exchange source data is also delivered "live" intraday via an intermediate third party as part of a proprietary data coding and real-time delivery feed process.

In some embodiments, data aggregation system 104 may pull data values/file 103 from data sources 102. In some embodiments, data from data source 102 is in a flat, comma-separated file (CSV) format. The data from data source 102 may be read, line by line, with the header row omitted, using data aggregation system 104. Data aggregation system 104 may load the data into database 106, until an end of file flag is read. In some embodiments, the data from data aggregation system 104 is not manipulated when inputted into database 106.

In one embodiment, data sources 102 include a US Bank's FTP, that contain each fund's official end of day NAV, Shares Outstanding, Midpoint, SEC 30 Day Yield, and 30 Day Median Bid-Ask Spread. Preferably, data aggregation system 104 may aggregate all the data values 103 from data sources 102 and store the data values 103 in the web server's database 106. In one embodiment, database 106 is configured to pull data file 103 at approximately the same time on a daily basis (e.g., days that the markets are open).

In some embodiments, at the close of business, the last trade prices of data values 103 are acquired from data sources 102 for all ETFs associated with the Fund. The last trade prices of data values 103 may be stored and archived in the web server's database 106.

Figure 10A:
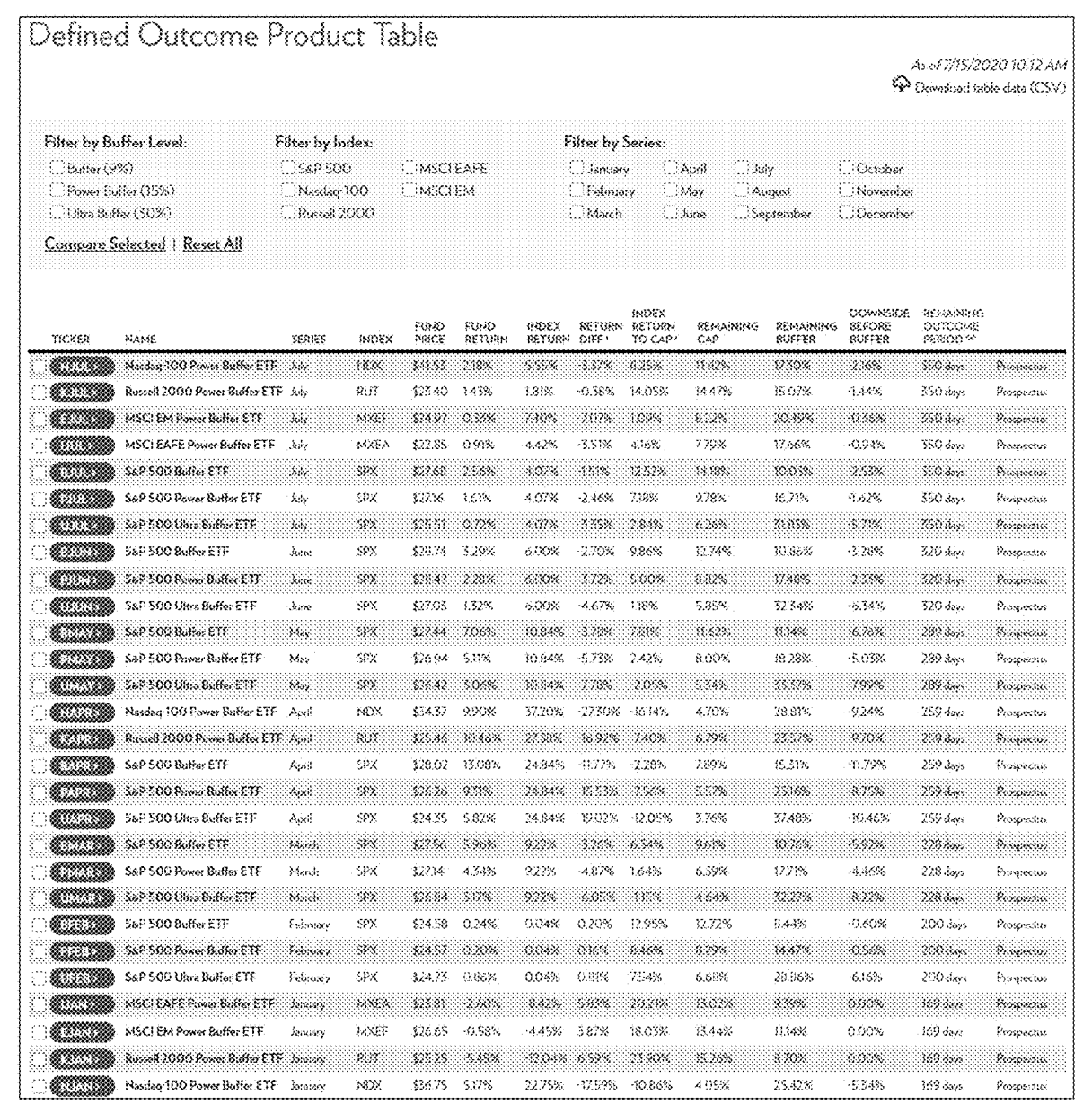
Figure 10B:
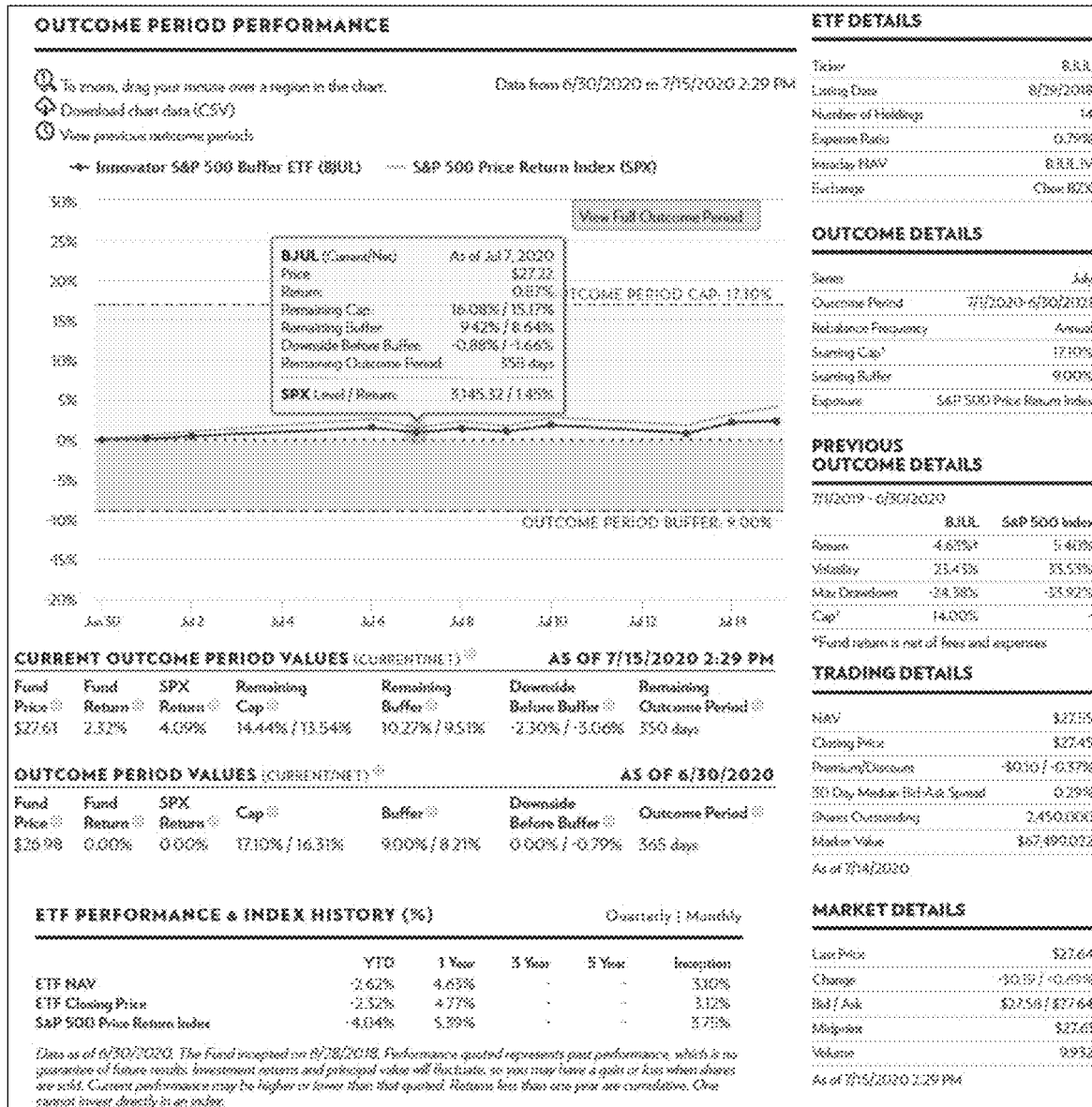

In some embodiments, the proprietary coding of the invention is configured to for at least one of: i) selecting several data value factors from data file 103, ii) recalculating the value factors, iii) incorporating additional or separate data values into the selected value factors. For example, the proprietary coding is configured for (i) selecting or suppressing one or more data value factors from data file 103 (e.g., 2 of 16 data values may be suppressed) and/or (ii) aggregating and/or recalculating the selected data value factors with additional data values, which are separately stored data on database 106, the outcome of which may also be stored on database 106. In some embodiments, processor 108 is configured to upload the recalculated value factors for each investment fund associated with the Fund to data network 116, where tool 112 may pull the product data. In some embodiments, product data tool 112 is a web-based tool 112 that displays one or more of NAVs, Shares Out, AUM, Midpoint and premium/discount calculations on the respective funds' overview pages, such as shown in FIG. 10B. In some embodiments, data network 116 includes website 110, which may host tool 112. Website 110 may be configured to make calls to processor 108 to request information from data aggregation system 104.

In some embodiments, data conversion and parsing occurs between processor 108 and web site 110 and/or data network 116. When a user request is identified website 110 (e.g., in response to a user accessing tool 112), a request to processor 108 invoked. Website 110 and/or data network 116 may pass key fund identifiers to processor 108 such as one or more of: fund ticker, starting price, starting cap, outcome period starting date, and outcome period ending date. Website 110 and/or data network 116 may then invoke processor, 108, to execute a stored procedure, returning a dataset of text and decimals (the decimals are formatted as varchars in the result set). In some embodiment, the resulting text does not need to be reformatted, and contains basic fund information including one or more of ticker, index name, fund name, monthly series, index ticker, index name, and buffer type (B, P, U—e.g. 9%, 15%, 30%). The non-text figures returned may be inherently returned as a database varchar format instead of decimals. In some embodiments, processor 108 is configured to match the parameters received, as mentioned above, with the most recent market data (fund market price, index level), and processes the defined outcome parameters. In some embodiments, processor 108 is configured to interpret this database result set and converts the values returned on the fly by website 110 and/or data network 116 when the data request is made. The values returned by processor 108 to website 110 and/or data network 116 may include one or more of fund return, index return, remaining fund caps (current and net of all fees), remaining buffer (current and net of all fees), downside before buffer (current and net of all fees), and remaining outcome period. In some embodiments, website 110 and/or data network 116 converts this data from a varchar format to decimal and float data types so data formatting can be performed. Processor 108 may be configured to calculate the necessary values and format the data back to strings/varchars for display on website 110, with the appropriate decimal places and data formatting being applied.

As noted above, in some embodiments, tool 112 is populated with "real-time" data for public use. Such an embodiment may provide for building data methodology, which is a material enhancement above the functionality of end of day data displays. For example, an investor in the Fund may purchase shares of the Fund intraday, as the price of the Fund fluctuates (along with the share prices of the public securities held by the Fund). It is understood that the investor would recognize that the data values of the Fund at the end of the prior trading day would not be providing the investor as accurate a reflection of what their purchasing experience—or investment profile—might look like as they purchase the shares of the Fund. The present invention, through, for example, tool 112, may deliver to the user interface more granular and current data values.

In some embodiments, for a user using tool 112, a user may activate the interactive feature either by clicking on a function on tool 112 or scrolling their cursor over a specific display feature, which generates a pop-up dialogue box with data values. Whenever the user interface initiates a data function on tool 112, tool 112 may automatically generate a data "pull" from data sources 102. Data sources 102 may have a direct contractual arrangement with the exchanges to pull certain market and trading data relative to the Fund trading on that exchange throughout the trading day. While data sources 102 receive data directly from the exchanges, data sources 102 may place a rolling 15-minute release delay when such data is requested by data aggregation system 104 throughout the day.

In some embodiments, for both tool 112 and the display of real-time pricing the website via a display of the user interface configured to display tool 112, every time a user goes to the Product Table page, an example show in FIG. 10, during a predetermined time, their interfacing results in a requesting "pull" for "real-time" pricing bids and asks for information relating to the Fund and respective underlying reference indexes from data sources 102 via vendors APIs (application programmer interface) associated with data sources 102 and, asking the API for a range of certain statistical data from the vendor about that ETF and their respective current index levels, such as, one or more of, a list of tickers, bids, asks, volumes, and a ISP timestamp.

In some embodiments, while the user does not see or experience this process directly, behind the design of the functional delivery of values via tool 112 requires the integration of multiple data sources 102, and processor 108 may be configured to pull, save, recalculate, and deliver to tool 112 on the website for ongoing, real-time use by the public.

In some embodiments, once the web server's database 106 gets the data from data sources 102 via data aggregation system 104, processor 108 is configured to receive all the fund market data, and performs the necessary calculations (remaining cap, remaining buffer, etc.) and displays the data via tool 112. In some embodiments, processor 108 is configured to "sweep" and save to database 106 for historic End of Day NAVs for each of the ETFs, as well as the most recently midpoint for the DO ETFs. In some embodiments, during a predetermined time, such as between 8:45 and 3:30 pm, every time a user visits tool 112, processor 108 is configured to update each Fund's/ETFs most recent data. In some embodiment, tool 112 relies on both the historical EOD data (list of historical NAVs and historic index levels), in addition to the most recent midpoints and index levels.

In some embodiments, during a predetermined period of time, e.g. from the hours between 8:45 AM and 3:30 PM CT, a user may visit a web page hosted by data network 116, which may show specific Defined Outcome values via tool 112. In some embodiments, the predetermined period of time may refer to specific periods of time during the day when markets are open or closed. For example, the predetermined period of time may be between 8:45 AM and 3:30 PM CT, which reflects a period of time on a business day where the relevant US stock exchanges are open and actively trading. Data values disseminated from an exchange may not be available to the Fund for use until approximately 15 minutes after trading on the exchange has started, such as 15 minutes after 8:30 AM CT. Data network 116 may make a behind-the-scenes request to data sources to acquire the most recent market data values 103 (see "Intraday Inputs" above). Processor 108 may be configured to store the most recent market data values 103 in database 106, and a series of programming controls may use various methods to compute the following fields: Fund Return, Index Return, Return Difference, Index Return to Cap, Remaining Cap, Remaining Buffer, Downside Before Buffer, Remaining Outcome Period, and more. The Inputs required for these calculations and their respective sources are shown in Table 1 below, where Company refers to the provider of the Fund.

TABLE 1

| Input | Source |
| --- | --- |
| Starting Fund Buffer | Company (static) |
| Starting Fund Cap | Company (static) |
| Fund Expense Ratio | Company (static) |
| Fund Market Price | Data Sources 102 |
| Index Level | Data Sources 102 |
| Fund Outcome Period Start & End Date | Company (static) |
| Fund EOD NAV | Data Sources 102 |

In some embodiments, use of tool 112 during a predetermined time, such as between the hours of 3:30 pm CT and 8:45 am CT, may automatically toggle, via processor 108, the switch to turn off or "silence" requests to pull data from data sources 102. For example, if processor 108 automatically makes the toggle switch goes to "silent" mode and the stops making data requests data sources 102, for the predetermined period of time, tool 112 may reflect the incorporation of data sources 102 as of a specific time, such as the end of that market day (e.g., 3:59 pm). In some embodiments, once data file 103 is received by data aggregation system at the end of the day (e.g., 7:00 pm), the most current data factors are replaced with the official US Bank market closing data as generated pursuant to the process described above, and will display this until a specific time, such as 8:45 am CT on the next trading day when processor 108 toggles the switch to go to a "live" feed. As a result, tool 112 is "silenced"— which occurs by clicking or scrolling over features on tool 112 after trading hours on a week day, or on a weekend. In some embodiments, this provides the user with interactive "static" data values based off the "trued-up" US Bank data.

In some embodiments, during a predetermined period of time, e.g. from the hours between 3:30 PM and 8:45 AM CT, a user may visit website 110 hosted on data network 116. Tool 112 may access data network 116 to provide the most current stored fund and index market data values 103, which are stored on database 106.

In some embodiment, during the predetermined period of time, e.g. from the hours between 3:30 PM and 8:45 AM CT, data network 116 may no longer be capturing real-time data from data sources 102, since markets are closed. Once data aggregation system transmit data values 103 from data sources 102 to database 106, which may occur around 7 PM, the most recent fund market prices and values 103 are updated with the official end of day NAV provided by data sources 102.

In some embodiment, during the predetermined period of time, e.g. from the hours between 3:30 PM and 8:45 AM CT, data network 116 may no longer be capturing real-time data from data sources 102, since markets are closed. Once data aggregation system transmit data values 103 from data sources 102 to database 106, which may occur around 7 PM, the most recent fund market prices and data values 103 are updated with the official end of day NAV provided by data sources 102

Figure 8:
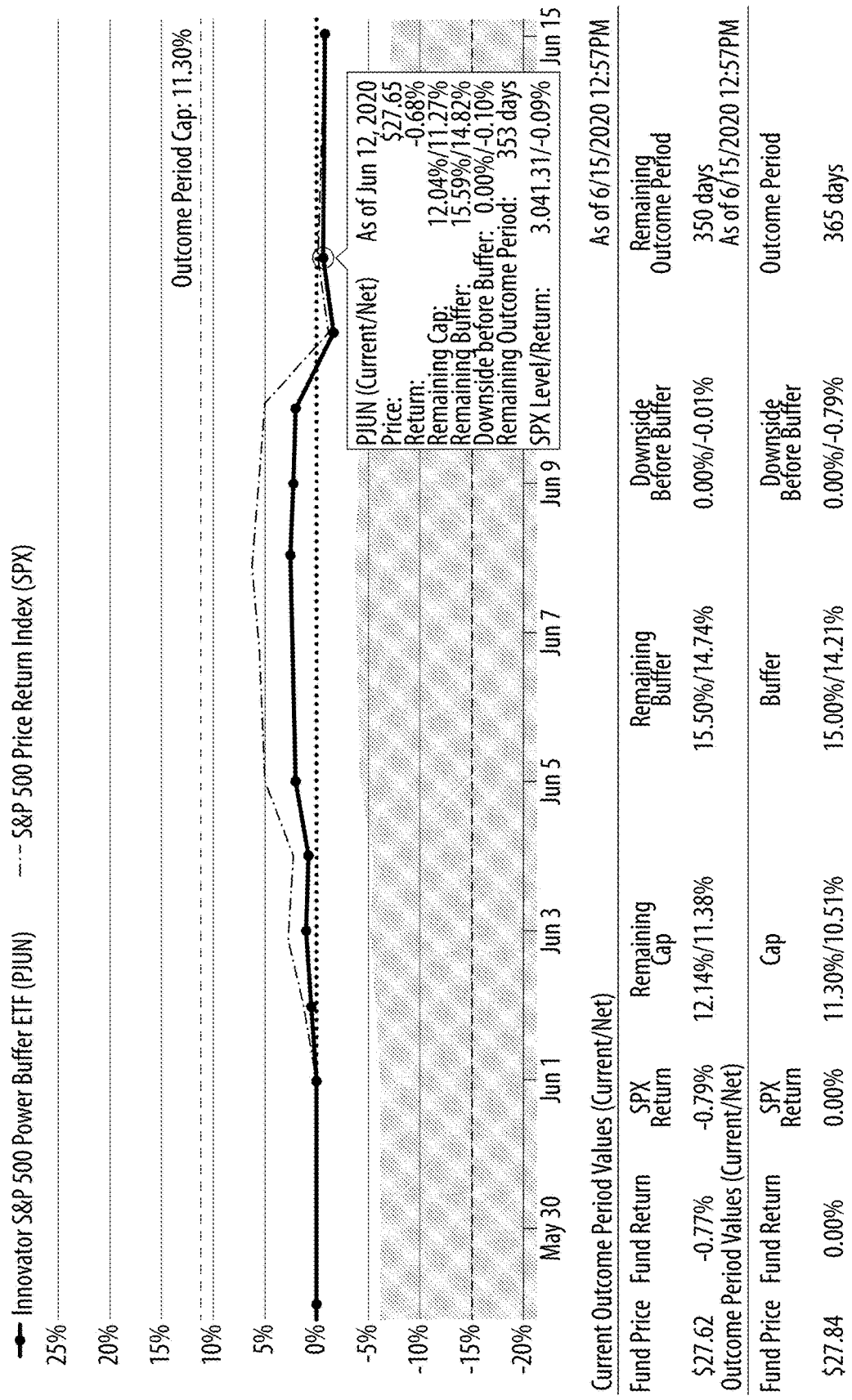
FIG. 8 is an illustration of an exemplary outcome tool associated with the exemplary fund.

In some embodiment, to build the graph in tool 112, such as the pricing tool shown in FIG. 8, processors 108 is configured to utilize the historic values from data sources 102 and current market data values 103 that have been captured by data aggregation system 104 and stored within the web server's database 106. By using the inputs in Table 1 above, processor 108 may be configured to generate the following fields for every day in the fund's outcome period: Fund Return, Index Return, Return Difference, Index Return to Cap, Remaining Cap, Remaining Buffer, Downside Before Buffer, Remaining Outcome Period, and more. In addition to charting the data over the course of the current outcome period, processor 108 may be configured to display, via a user interface, detailed defined outcome parameters in a tooltip pop-up associated with tool 112 for each day.

Figure 9:
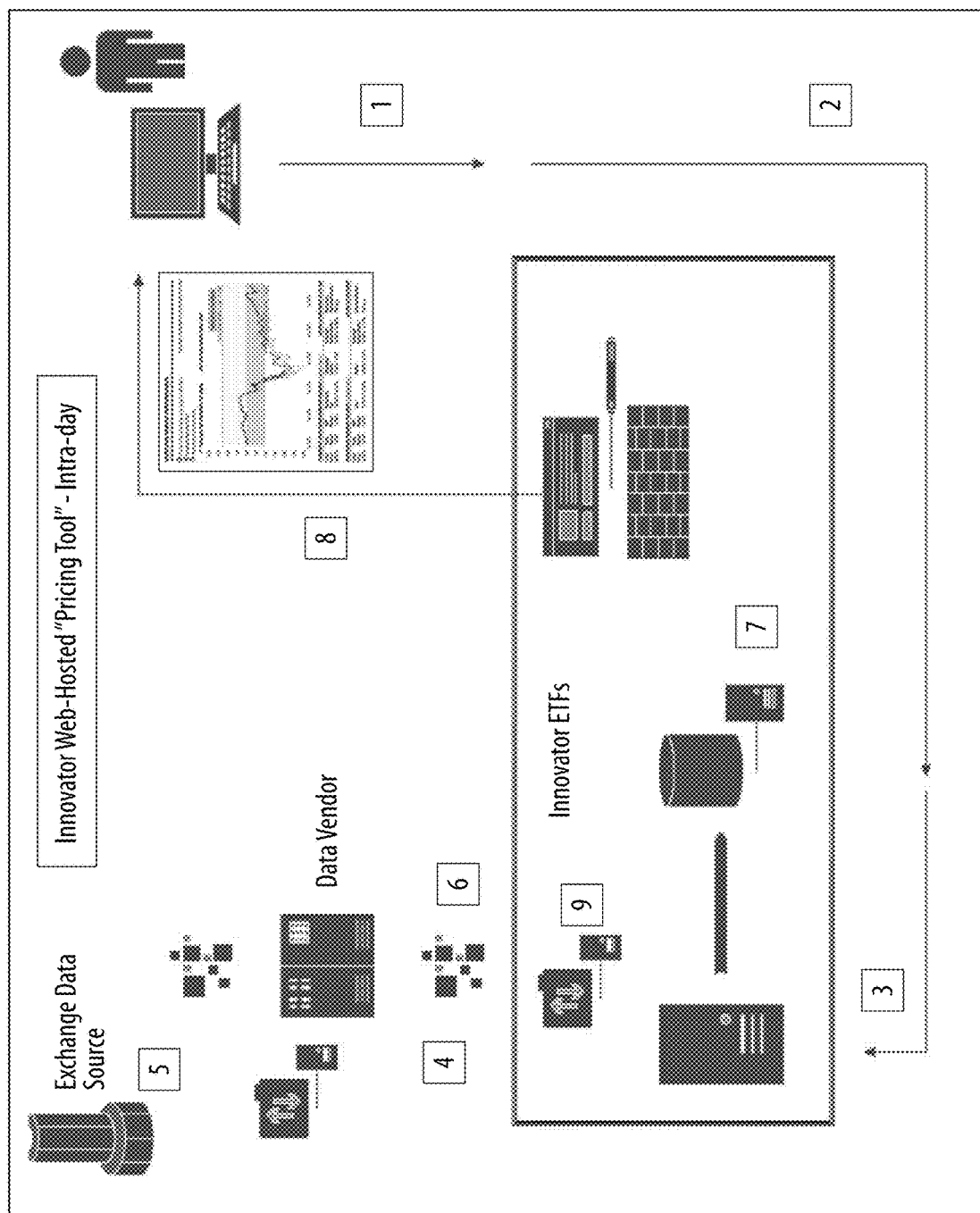
FIG. 9 is an illustration of a system for accessing the exemplary outcome tool associated with the exemplary fund.

Referring to FIG. 9, diagram 10 represents a user is on a web site and accessing interactive tool 112 in the middle of a trading day, with all the automated interfaces, calculations, and displays. In some embodiments, diagram 10 may utilize the components detailed in FIGS. 7A and 7B. In some embodiments, the methods and steps of depicted in diagram 10 utilizes proprietary code.

STEP 1 illustrates that the data process begins with a click or cursor trigger on the web site as a result of the user's activity. In some embodiments, a user may click on tool 112, which is rendered via user interface.

STEP 2 illustrates the "request" by the user action, and provide notice to the servers/database, such as database 106.

STEP 3 illustrates servers, for example, database 106, receiving the data request to refresh the web site data values on website 110, and initiating an automatic request to the third-party data vendor, such as data sources 102, for this data request.

STEP 4 illustrates the functionality of an automated data pull from the data vendor, such as data sources 102, via an API interface, pursuant to an automated protocol.

STEP 5 illustrates that data sources 102 may receive the live market data directly from the exchanges, saving it to their own databases and "unlocked" to be made available to their data clients (e.g., data aggregation system 106) for data pulls on a rolling 15-minute delay.

STEP 6 illustrates that the automated data pull, from the data sources 102, delivers data values and factors to a database, such as database 106, where it is saved pursuant to an automated code sequence.

STEP 7 illustrates t automatically taking the saved data from the data sources 102, adding additional source data factors, and calculating updated and unique values for the data set.

STEP 8 illustrates formatting and delivering critical data and functionality of the data pivots on tool 112.

STEP 9 illustrates toggling the data feed request to the data sources 102 to the "off switch" at approximately 3:45 pm CT on any given trading day, thus, subject to any revisions as a result of the end of day values from US Bank or other data sources 102, holding those data values reflected via tool 112 until the morning of the next trading day.

One of skill in the art may appreciate from the foregoing that unexpected benefits are derived from application of the method, system, and apparatus to the problem of improving ETFs by incorporating a defined outcome feature, without the need for additional steps or system features. Changes to a system of an embodiment of this invention may add costs and complexity to the engine system. A key benefit contemplated by the inventors is improvement via the disclosed system, method, or apparatus, while excluding any additional components, steps, or change in features. Accordingly, the substantial benefits of simplicity as to which the method and system may be applied may reside in an embodiment of the invention consisting of or consisting essentially of features of the method, system, or apparatus disclosed herein. Thus, embodiments of the invention contemplate the exclusion of steps, features, elements, and components beyond those set forth herein. The inventors contemplate, in some embodiments, the exclusion of certain steps, features, elements, and components that are set forth in this disclosure even when such are identified as preferred or preferable.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in association with another embodiment. The scope of the invention should, therefore, be determined with reference to the appended claims, along with the full scope of equivalents to which such claims are entitled.

The invention claimed is:

1. A computer-based system for displaying, on a user interface, investment outcome alternatives, the system comprising:
    a data aggregation system configured to:
        automatically obtain from an exchange data source, during a predetermined period, securities data associated with a security; and
    a processor, coupled to the data aggregation system, configured to render, on a user interface during a display date, a dynamic tool configured to receive user input and display data based on the user input and the securities data, the dynamic tool including:
        a graphical representation of an outcome period cap for a current outcome period, wherein the graphical representation of the outcome period cap reflects a remaining return rate cap based on the securities data;
        in an interactive window, rendered in response to the user input via the user interface of a selected date, date-specific investment data associated with the security, and comprising a date-specific remaining cap and a date-specific remaining buffer, that are each associated with the selected date; and
        an automatic update of the graphical representation including updates of the outcome period cap after an end of the current outcome period.

2. The computer-based system of claim 1, wherein the dynamic tool includes:
    a graphical representation of a buffer threshold for the current outcome period, the buffer threshold associated with losses from an investment in the security, wherein the graphical representation of the buffer threshold includes a remaining buffer threshold.

3. The computer-based system of claim 2, wherein the interactive window obscures at most one of the graphical representation of the outcome period cap and the graphical representation of the buffer threshold.

4. The computer-based system of claim 2, wherein the interactive window moves from a first position proximate the graphical representation of the outcome period cap to a second position proximate the graphical representation of the buffer threshold.

5. The computer-based system of claim 2, wherein at least a portion of the interactive window is disposed between the graphical representation of the outcome data and the graphical representation of the buffer threshold.

6. The computer-based system of claim 1, wherein a position of the interactive window is based on a user's interaction with the graphical display.

7. The computer-based system of claim 6, wherein a line curve graph is displayed between the graphical representation of the outcome period cap and a graphical representation of an outcome period buffer.

8. The computer-based system of claim 1, wherein a position of the interactive window is linked to a positioning of a user's selection.

9. The computer-based system of claim 8, wherein the graphical representation of the outcome period cap includes a line curve graph and the interactive window is rendered in a position that is based on the positioning of the user's selection on the line curve graph.

10. The computer-based system of claim 1, wherein the graphical representation is displayed proximate the interactive window.

11. The computer-based system of claim 1, wherein the interactive window at least partially overlaps with the graphical representation.

12. The computer-based system of claim 1, wherein digital securities data is automatically obtained from the exchanged data source periodically during the predetermined period and stored in a database.

13. The computer-based system of claim 1, wherein the interactive window is at least partially disposed between a graphical representation of the outcome data and the graphical representation of the outcome period.

14. The computer-based system of claim 1, wherein the user input includes a selection of a function on the dynamic tool or scrolling a cursor to a specific display feature.

15. The computer-based system of claim 1, wherein the interactive window is configured to obscure at least a portion of the graphical display.

16. The computer-based system of claim 1, wherein the selected date predates the display date and is within the current outcome period.

17. The computer-based system of claim 1, wherein the dynamic tool includes:

a graphical representation of a performance of the security that terminates prior to an end of the current outcome period.

18. A computer-based method for displaying investment outcome, the method comprising:

automatically obtaining from an exchange data source, during a predetermined period, securities data associated with a security;

rendering, using a processor on a user interface during a display date, a dynamic tool configured to receive user input and display data based on the user input and the securities data, the dynamic tool including:

a graphical representation of an outcome period cap for a current outcome period, wherein the graphical representation of the outcome period cap reflects a remaining return rate cap based on the securities data; and in an interactive window, rendered in response to the user input via the user interface of a selected date, date-specific investment data associated with the security, and comprising a date-specific remaining cap and a date-specific remaining buffer, that are each associated with the selected date; and an automatic update of the graphical representation including updates of the outcome period cap after an end of the current outcome period.

\* \* \* \* \*